US012712597B1

(12) United States Patent
Chen et al.

(10) Patent No.: US 12,712,597 B1
(45) Date of Patent: Aug. 18, 2026

(54) SYSTEMS AND METHODS FOR MANAGING DOPPLER SHIFT IN CELLULAR SERVICE SIGNALS FROM TERRESTRIAL USER EQUIPMENT AT A SATELLITE

(71) Applicant: Space Exploration Technologies Corp., Hawthorne, CA (US)

(72) Inventors: Chen Chen, Irvine, CA (US); Jonathan Hedstrom, Sunnyvale, CA (US)

(73) Assignee: Space Exploration Technologies Corp., Starbase, TX (US)

( * ) Notice: Subject to any disclaimer, the term of this patent is extended or adjusted under 35 U.S.C. 154(b) by 22 days.

(21) Appl. No.: 18/762,174

(22) Filed: Jul. 2, 2024

Related U.S. Application Data

(60) Provisional application No. 63/531,470, filed on Aug. 8, 2023.

(51) Int. Cl.
*H04B 7/01* (2006.01)
*H04B 7/06* (2006.01)
*H04B 7/185* (2006.01)

(52) U.S. Cl.
CPC .......... *H04B 7/01* (2013.01); *H04B 7/06958* (2023.05); *H04B 7/18582* (2013.01)

(58) Field of Classification Search
CPC .. H04B 7/01; H04B 7/06958; H04B 7/18523; H04B 7/18526; H04B 7/18528; H04B 7/18582; H04B 7/1858; H04B 7/18578; H04B 7/18586; H04B 7/06952
See application file for complete search history.

(56) References Cited

U.S. PATENT DOCUMENTS

| | | | | |
|---|---|---|---|---|
| 9,973,264 | B2 | 5/2018 | Vasavada et al. | |
| 9,973,266 | B1 | 5/2018 | Avellan et al. | |
| 10,084,535 | B1 | 9/2018 | Speidel et al. | |
| 10,439,706 | B2 | 10/2019 | Michaels | |
| 10,979,133 | B2 | 4/2021 | Zhang et al. | |
| 11,546,726 | B2 | 1/2023 | Speidel et al. | |
| 11,817,936 | B2 | 11/2023 | Yu et al. | |
| 2007/0233383 | A1* | 10/2007 | Churan | G01S 19/21 701/2 |
| 2018/0019811 | A1* | 1/2018 | Buer | H01Q 1/288 |
| 2018/0241464 | A1* | 8/2018 | Michaels | H04B 7/18539 |

(Continued)

*Primary Examiner* — Chieh M Fan
(74) *Attorney, Agent, or Firm* — Polsinelli PC

(57) ABSTRACT

A satellite computer system of a satellite is configured to communicate with user equipment (UE). The satellite includes an antenna configured to communicate with the UE via directional beams that define cells of a radio access network (RAN). The satellite computer system can perform steps that can include one or more of: receiving on a first beam a data stream including an uplink signal from a first UE, wherein the received uplink signal includes a Doppler shift; compensating the received data stream for a reference Doppler shift based on a trajectory of the satellite relative to a cell reference location of the first beam, wherein the reference-location-compensated uplink signal retains a residual Doppler shift; estimating a coarse portion of the residual Doppler shift; estimating a fine portion of the residual Doppler shift; and de-shifting the reference-location-compensated uplink signal by a shift frequency comprising the coarse portion and the fine portion.

20 Claims, 15 Drawing Sheets

(56) References Cited

U.S. PATENT DOCUMENTS

| | | | | |
|---|---|---|---|---|
| 2021/0218464 | A1* | 7/2021 | Yao | H04B 7/1858 |
| 2022/0046566 | A1* | 2/2022 | Leng | H04W 56/0045 |
| 2023/0022798 | A1* | 1/2023 | Li | H04W 74/0833 |
| 2023/0179990 | A1 | 6/2023 | Speidel et al. | |
| 2023/0361864 | A1 | 11/2023 | Yao et al. | |
| 2024/0031009 | A1 | 1/2024 | Zhang et al. | |
| 2024/0397340 | A1* | 11/2024 | Kim | H04W 16/28 |

* cited by examiner

1200
$x_D$
1201
1202
1203
$\tilde{x}_D$
$f$
$f_{shift}(1)$
$f_{shift}(2)$
$f_{shift}(3)$ 1100
1102
1104
1110
1112
1114
1120
$f_{shift}$ RECEIVING A DATA STREAM ON A FIRST BEAM, THE DATA STREAM INCLUDING AN UPLINK SIGNAL FROM A FIRST UE, WHEREIN THE RECEIVED UPLINK SIGNAL INCLUDES A DOPPLER SHIFT DUE TO ONE OR MORE OF AN ORBITAL MOTION OF THE SATELLITE RELATIVE TO THE EARTH AND A MOTION OF THE FIRST UE RELATIVE TO THE EARTH

Figure 14:
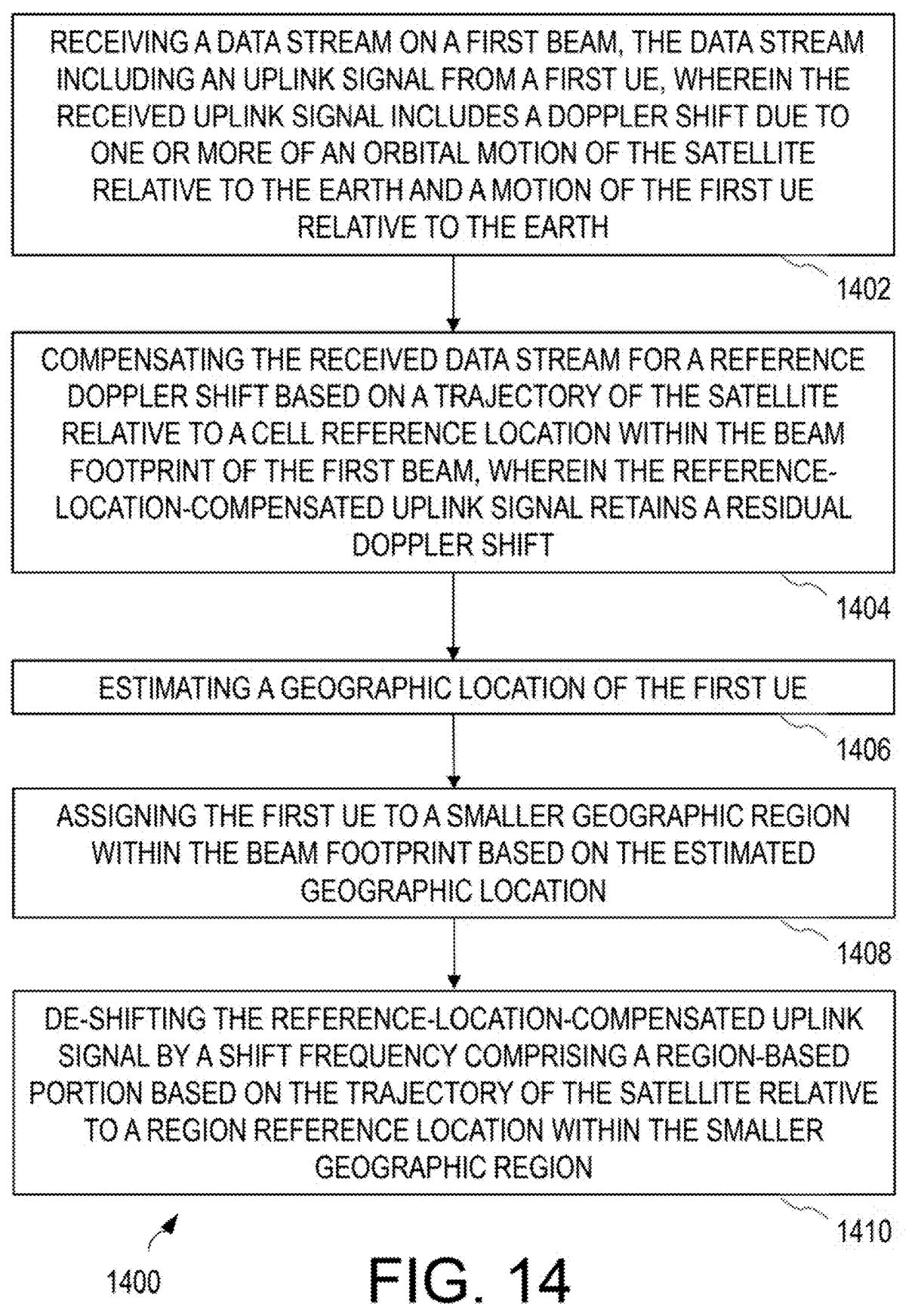

1402

COMPENSATING THE RECEIVED DATA STREAM FOR A REFERENCE DOPPLER SHIFT BASED ON A TRAJECTORY OF THE SATELLITE RELATIVE TO A CELL REFERENCE LOCATION WITHIN THE BEAM FOOTPRINT OF THE FIRST BEAM, WHEREIN THE REFERENCE-LOCATION-COMPENSATED UPLINK SIGNAL RETAINS A RESIDUAL DOPPLER SHIFT

1404

ESTIMATING A GEOGRAPHIC LOCATION OF THE FIRST UE

1406

ASSIGNING THE FIRST UE TO A SMALLER GEOGRAPHIC REGION WITHIN THE BEAM FOOTPRINT BASED ON THE ESTIMATED GEOGRAPHIC LOCATION

1408

DE-SHIFTING THE REFERENCE-LOCATION-COMPENSATED UPLINK SIGNAL BY A SHIFT FREQUENCY COMPRISING A REGION-BASED PORTION BASED ON THE TRAJECTORY OF THE SATELLITE RELATIVE TO A REGION REFERENCE LOCATION WITHIN THE SMALLER GEOGRAPHIC REGION

SYSTEMS AND METHODS FOR MANAGING DOPPLER SHIFT IN CELLULAR SERVICE SIGNALS FROM TERRESTRIAL USER EQUIPMENT AT A SATELLITE

CROSS-REFERENCE TO RELATED APPLICATIONS

The present application claims the benefit of, and priority to, U.S. Provisional Patent Application No. 63/531,470 filed Aug. 8, 2023 entitled "SYSTEMS AND METHODS FOR MANAGING DOPPLER SHIFT IN CELLULAR SERVICE SIGNALS FROM TERRESTRIAL USER EQUIPMENT AT A SATELLITE", the contents of which are hereby incorporated by reference in their entirety.

TECHNICAL FIELD

The present technology pertains to using satellites to provide cellular telecommunications base station services to terrestrial user equipment, and more specifically to managing, at a satellite, Doppler shift in signals between the satellite and terrestrial user equipment.

BACKGROUND

Terrestrial cellular telecommunication networks typically rely on Earth-based cellular towers for wireless communication in designated radio frequency bands with user equipment (for example, mobile phones, cellular-enabled computer devices, and the like). The Earth-based cellular towers implement a radio access network (RAN) that links the user equipment to functionality for handling voice calls and SMS messages and providing Internet connectivity, for example. However, communications coverage by Earth-based cellular towers is limited or unreliable in some areas, particularly (but not only) in less developed regions of the world.

The use of satellites to provide cellular telecommunication links to terrestrial user equipment has been proposed. However, the accepted telecommunications standards implemented by off-the-shelf user equipment are designed for conditions that include stationary, terrestrial base station hardware, and thus the user equipment can operate successfully within only a limited range of Doppler shift between the user equipment and the base station hardware. The relative velocity of satellites passing in range of the user equipment fall well outside this limited range of Doppler shift. Accordingly, standard protocols for handling signals between base stations and terrestrial user equipment are insufficient at a base station implemented on a satellite.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure introduces a novel approach to correcting for Doppler shift in signals received on a directional radio frequency (RF) beam from user equipment (UE) at a satellite that implements a base station of a radio access network. In particular, the Doppler shift for each uplink signal from the UE can be estimated in different portions using different types of information available to the satellite computer network. For example, the received beam signal can be corrected across all UE for Doppler shift relative to a (stationary) cell reference location within the cell, leaving a residual Doppler shift in the uplink signals from each UE that varies by the UE's own position and motion relative to the cell reference center. The residual Doppler shift for each UE can be resolved into coarse and fine portions, which can be estimated based on one or more of correlating reference information within the uplink signal, generating a hypothetical Doppler-distorted version of the reference information at the satellite for comparison to the received uplink signal, or relying on the coarse portion determined from an initial access signal from the UE until error checking or a trend in the fine portion indicates a change in the coarse portion.

Another approach that can be used separately from, or in combination with, the approaches discussed above includes an algorithm that estimates a more precise location of the UE based on a series of signal propagation delay values for the UE. The UE can then be assigned to a smaller geographic region within the cell, and a Doppler correction based on a regional reference location within the smaller geographic region can be applied.

In accordance with an embodiment of the present disclosure, a satellite computer system for a satellite is provided. The satellite includes at least one antenna configured to send and receive signals to terrestrial user equipment (UE) on a radio access network (RAN) via a plurality of directional beams, each of the beams having a beam footprint that defines a cell of the RAN. The satellite computer system includes at least one processor in communication with a memory, the memory storing computer-readable instructions that are executable to cause the at least one processor to perform steps that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth; compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location; estimating a coarse portion of the residual Doppler shift; estimating a fine portion of the residual Doppler shift; and de-shifting the reference-location-compensated uplink signal by a shift frequency comprising the coarse portion and the fine portion.

In accordance with another embodiment of the present disclosure, a method of operating a satellite computer system on a satellite is provided. The satellite includes at least one antenna configured to send and receive signals to terrestrial user equipment (UE) on a radio access network (RAN) via a plurality of directional beams, with each of the beams having a beam footprint that defines a cell of the RAN. The satellite computer system includes at least one processor in communication with a memory. The method includes steps performed by the at least one processor that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth; compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location; estimating a coarse portion of the residual Doppler shift; estimating a fine portion of the residual Doppler shift; and de-shifting the reference-location-compensated uplink signal by a shift frequency comprising the coarse portion and the fine portion.

In accordance with another embodiment of the present disclosure, a satellite computer system for a satellite is provided. The satellite includes at least one antenna configured to send and receive signals to terrestrial user equipment (UE) on a radio access network (RAN) via a plurality of directional beams, each of the beams having a beam footprint that defines a cell of the RAN. The satellite computer system includes at least one processor in communication with a memory, the memory storing computer-readable instructions that are executable to cause the at least one processor to perform steps that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth; compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location; estimating a geographic location of the first UE; assigning the first UE to a smaller geographic region within the beam footprint based on the estimated geographic location; and de-shifting the reference-location-compensated uplink signal by a shift frequency comprising a region-based portion, the region-based portion based on the trajectory of the satellite relative to a region reference location within the smaller geographic region.

In accordance with another embodiment of the present disclosure, a method of operating a satellite computer system on a satellite is provided. The satellite includes at least one antenna configured to send and receive signals to terrestrial user equipment (UE) on a radio access network (RAN) via a plurality of directional beams, with each of the beams having a beam footprint that defines a cell of the RAN. The satellite computer system includes at least one processor in communication with a memory. The method includes steps performed by the at least one processor that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth; compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location; estimating a geographic location of the first UE; assigning the first UE to a smaller geographic region within the beam footprint based on the estimated geographic location; and de-shifting the reference-location-compensated uplink signal by a shift frequency comprising a region-based portion, the region-based portion based on the trajectory of the satellite relative to a region reference location within the smaller geographic region.

BRIEF DESCRIPTION OF THE DRAWINGS

In order to describe the manner in which the above-recited issues can be addressed, a more particular description of the principles briefly described above will be rendered by reference to specific embodiments thereof that are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 14 illustrates another example method in accordance with embodiments of the present disclosure.

DESCRIPTION OF EXAMPLE EMBODIMENTS

Figure 1A:
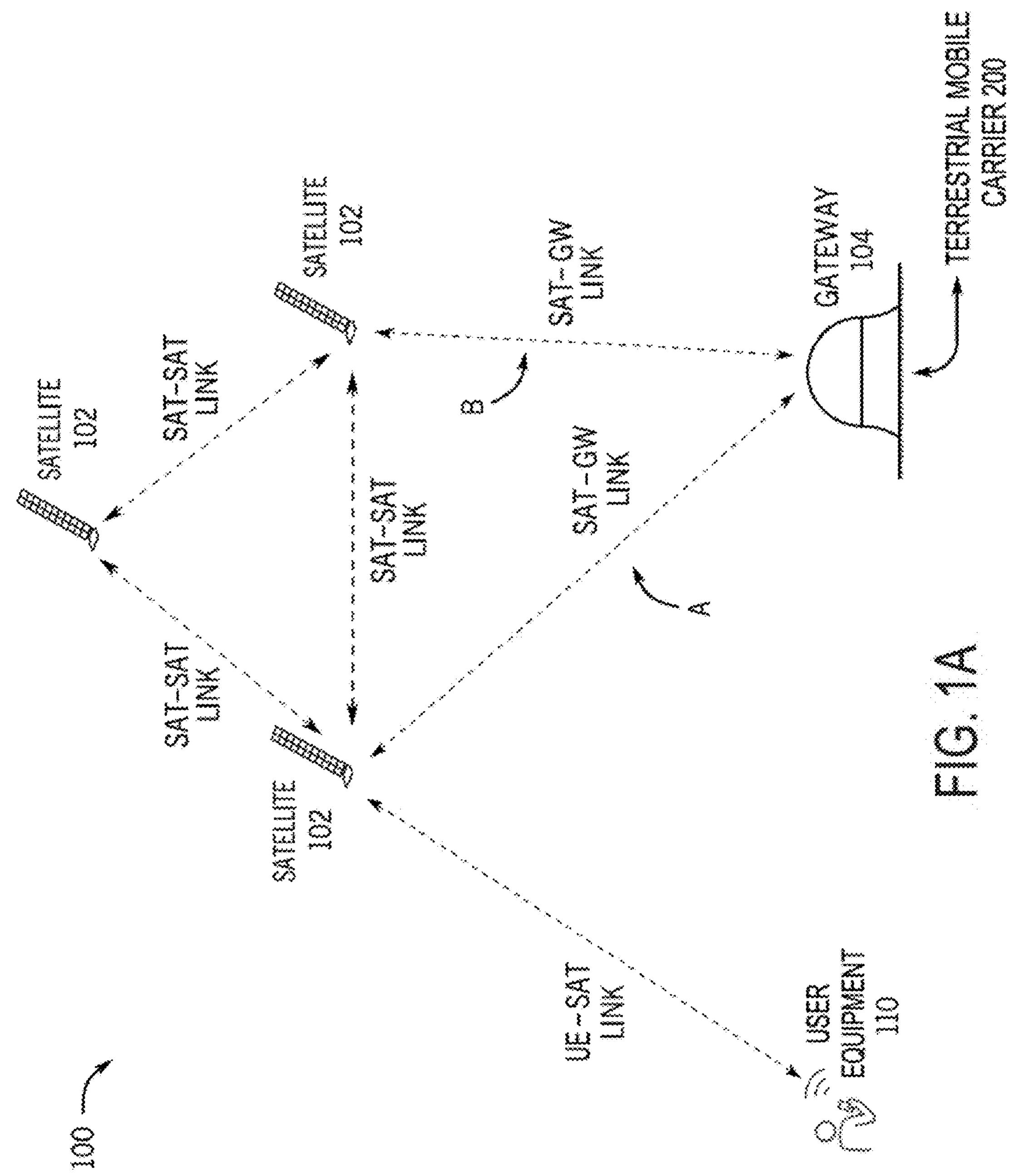
FIG. 1A illustrates a simplified schematic of an exemplary satellite telecommunications system in accordance with embodiments of the present disclosure.

Various example embodiments of the disclosure are discussed in detail below. While specific implementations are discussed, it should be understood that this description is for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment. Such references mean at least one of the example embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative example embodiments mutually exclusive of other example embodiments.

Moreover, various features are described which may be exhibited by some example embodiments and not by others. Any feature of one example can be integrated with or used with any other feature of any other example.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various example embodiments given in this specification.

Without intent to limit the scope of the disclosure, examples of instruments, apparatus, methods and their related results according to the example embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

For clarity of explanation, in some instances the present technology may be presented as including individual functional blocks representing devices, device components, steps or routines in a method embodied in software, or combinations of hardware and software.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Elements of a Satellite Telecommunications System

Figure 1B:
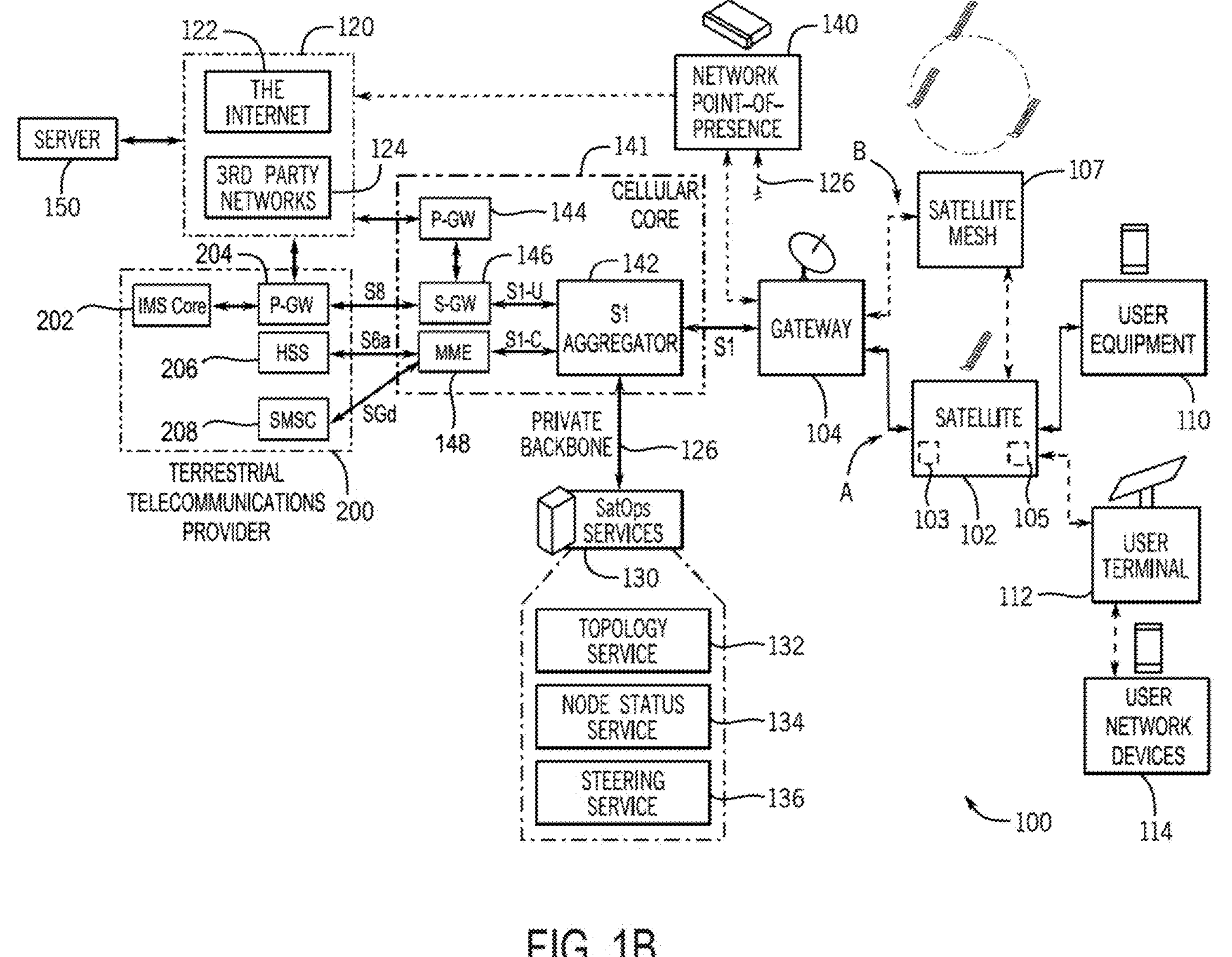
FIG. 1B illustrates a simplified block diagram of the satellite telecommunications system of FIG. 1A in accordance with embodiments of the present disclosure.

FIG. 1A is a simplified schematic, and FIG. 1B is a simplified block diagram, of elements of an exemplary satellite telecommunications system 100 in communication with user equipment (UE) 110. UE 110 may be any device that is capable of communicating with a standard terrestrial cellular phone tower and base station via a radio access network (RAN). For example, UE 110 may be an off-the-shelf mobile phone or other device implementing the 4G LTE communication standard. Alternatively, UE 110 may implement another standard compatible with terrestrial cellular service, such as but not limited to the 5G NR standard.

The satellite 102 provides a base station platform, in lieu of a conventional terrestrial cell phone tower and base station, for communicating with the UE 110. The base station platform provided by the satellite 102 includes both hardware and processing capability sufficient to implement the base station platform in a fashion that enables direct communication with the UE 110, with no hardware or software modifications required for standard-compliant UE 110. For example, in an embodiment in which the RAN is implemented using the 4G LTE standard, the satellite 102 hosts an Evolved Node B (eNodeB) platform.

UE 110 may establish a wireless UE-SAT link with one of the satellites 102 using a standard random access protocol of the RAN within a radio frequency (RF) band allocated for cellular communications. The cellular RF band may be allocated directly to the satellite telecommunications system 100 by a regulatory jurisdiction in which the UE 110 is located, or may be sub-allocated to the satellite telecommunications system 100 by the terrestrial telecommunications provider 200. For example, each of the satellites 102 may include one or more phased array antennas 105 for transmitting and receiving RF signals in the cellular RF band. In some embodiments, the phased array antenna 105 may include separate antenna arrays for transmitting and for receiving. Alternatively, the phased array antenna 105 may be implemented with transmitting and receiving performed by a same antenna array. In addition, the UE 110 may include a standard antenna (not shown) for off-the-shelf terrestrial user equipment, such as, for example, an internal Global System for Mobile Communication (GSM) antenna, for transmitting and receiving RF signals in the cellular RF band. However, other types of communication links are also contemplated for implementing the UE-SAT link.

The elements of the satellite telecommunications system 100 are capable of communication with each other via a mesh topology. The term "mesh topology" refers to the configuration of the elements as nodes in a mesh network. The various nodes in the mesh network coordinate with one another to efficiently route data in order to respond to requests for user data. As will be discussed in more detail herein, the configuration of the nodes in the mesh topology changes dynamically in satellite telecommunications system 100 to account for factors such as the motion of the satellites 102 relative to the Earth's surface and, in some cases, relative motion among the satellites 102. For example, as part of the network mesh topology of the satellite telecommunications system 100, certain satellites 102 may communicate directly with each other in a satellite mesh topology 107.

In addition to the satellites 102, the satellite telecommunications system 100 also includes a gateway terminal 104 on Earth. Each satellite 102 includes an onboard satellite computer system 103 programmed to manage communications with UE 110, gateway terminals 104, and other satellites 102, using one or more antennas (e.g., RF antennas and/or laser communication terminals) of the satellite. In particular, the satellite computer system 103 routes communications to and from UE 110, and to and from other nodes of the system, through the respective satellite 102 as part of the network mesh topology.

In some embodiments, in addition to providing cellular telecommunications service to UE 110, the satellite telecommunications system 100 may simultaneously provide Internet Protocol (IP) network connectivity to user terminals 112 that include a system-specific antenna. User terminals 112 may be installed at a house, a business, a vehicle (e.g., a land-, air-, or sea-based) vehicle, or another Earth-based location where a user desires to obtain communication access or Internet access via the satellites 102. An Earth-based user terminal 112 may be a mobile or non-mobile terminal connected to Earth or as a non-orbiting body positioned near Earth. For example, an Earth-based user terminal 112 may be in Earth's troposphere, such as within about 10 kilometers (about 6.2 miles) of the Earth's surface, and/or within the Earth's stratosphere, such as within about 50 kilometers (about 31 miles) of the Earth's surface, for example on a stationary object, such as a balloon, or a mobile object, such as an automobile or an airplane.

For example, the user may connect one or more network devices 114 such as desktop computers, laptops, mobile devices, Internet of Things (IOT)-enabled devices, and the like (collectively, "customer equipment") locally to the user's user terminal 112 and obtain access via satellites 102 to the Internet. Although the local connection between the customer equipment and the user terminal is illustrated as a WiFi router 118 (or more broadly a WiFi mesh), other types of wired or wireless local communication are also contemplated.

The gateway terminal 104 serves as a satellite access gateway for the satellite(s) 102 to communicate with one or more terrestrial telecommunications providers 200. Each terrestrial telecommunications provider 200 may be an independent operator of one or more standard Earth-based telecommunications networks. In the exemplary embodiment, satellite telecommunications system 100 has no native users, but instead provides service solely through roaming relationships with the one or more terrestrial telecommunications providers 200. In other words, UE 110 are not registered and authorized directly for use on the satellite telecommunications system 100, but are registered and authorized for use on the terrestrial telecommunications provider 200 and may connect via the satellite telecommunications system 100 when connectivity to the Earth-based cellular towers associated with the terrestrial telecommunications provider 200 is unavailable or unreliable. However, embodiments are also contemplated in which the satellite telecommunications system 100 provides cellular services directly to native users, without interfacing through an independent terrestrial telecommunications provider 200.

The gateway terminal 104 may be connected to a cellular core 141 of the satellite telecommunications system 100. The cellular core 141 may be hosted at one or more terrestrial locations which may be connected to a terrestrial private network, referred to as a "private backbone" 126, of the satellite telecommunications system 100. In the exemplary embodiment, the private backbone 126 may be implemented on an Internet-based secure cloud platform, such as Microsoft Azure® or Amazon Web Services® (AWS) by way of non-limiting examples. However, other implementations of the private backbone 126 are also contemplated. For example, a dedicated cellular core 141 may be assigned to each gateway terminal 104, and may be physically wired to the gateway terminal 104. In some cases, multiple gateway terminals 104 at a same site can be connected to a same cellular core 141. Additionally or alternatively, different gateway terminals 104 at a same site can be connected to different cellular cores 141. In some embodiments, an instance of the cellular core 141 is co-located with each gateway terminal 104.

In the exemplary embodiment, the cellular core 141 hosts an aggregator node 142 that provides an interface between the satellites 102 and the core telecommunications functionality of the satellite telecommunications system 100. For example, in a 4G LTE implementation, the cellular core 141 includes Evolved Packet Core (EPC) functionality. More specifically, each satellite 102 functions as an eNodeB, and the aggregator node 142 provides an S1 interface between the eNodeBs on multiple satellites 102 and the EPC functionality. In the example, the cellular core 141 may include one or more of a Packet Data Network Gateway (P-GW) 144 of the EPC, a user plane interface S1-U to a Serving Gateway (S-GW) 146 of the EPC, and a control plane interface S1-C to a mobility management entity (MME) 148 of the EPC. It is contemplated that the cellular core 141 may provide additional or alternative core functionality, and the aggregator node 142 may provide other suitable interfaces to multiple satellites, either in a 4G LTE implementation or other RAN implementations.

In the exemplary embodiment, the P-GW 144 provides a point-of-presence on one or more ground-based IP networks 120, such as the Internet 122 or another ground-based IP network 124. For example, the "other" type of ground-based IP network 124 may represent a limited access third-party network, such as but not limited to a cloud computing data center. P-GW 144 may allocate IP addresses to the UE 110 and enable the cellular core 141 to access data from the ground-based IP network 120 (e.g., from one or more servers 150) and provide the data back through the satellite telecommunications system 100 to the UE 110.

In the exemplary embodiment, S-GW 146 provides an interface to a separate P-GW 204 of the terrestrial telecommunications provider 200. For example, in a 4G LTE implementation, the interface is an S8 interface. P-GW 204 of the terrestrial telecommunications provider 200 may cooperate with an IP Multimedia Subsystem (IMS) core 202 of the terrestrial telecommunications provider 200 to enable the terrestrial telecommunications provider 200 to independently provide UE 110 with access to the one or more ground-based IP networks 120 (such as the Internet 122). Each terrestrial telecommunications provider 200 may make arrangements with the satellite telecommunications system 100 as to whether, and in what circumstances, to provide IP network access to the UE 110 via P-GW 144 as opposed to via P-GW 204.

In the exemplary embodiment, MME 148 provides an interface to a Home Subscriber Server (HSS) 206 of the terrestrial telecommunications provider 200. For example, in a 4G LTE implementation, the interface is an S6a interface. The HSS 206 is a database including subscription information of UE 110 with the terrestrial telecommunications provider 200, as well as other information regarding UE 110.

In the exemplary embodiment, MME 148 also provides an interface to a Short Message Service Center (SMSC) 208 of the terrestrial telecommunications provider 200. For example, in a 4G LTE implementation, the interface is an SGd interface. The SMSC 208 routes text messages to and from UE 110.

The communication signal paths in the satellite telecommunications system 100 may also include a link between the user terminal 112 and one of the satellites 102 in the mesh, which may be referred to as a UT-SAT link. In the exemplary embodiment, the UT-SAT link is implemented as a Ku-band radio frequency (RF) link. For example, the user terminal 112 and each of the satellites 102 may include one or more phased array antennas for transmitting and receiving RF signals in the Ku band. In the exemplary embodiment, the phased array antenna used by the satellite 102 for communicating with the user terminals 112 is a separate antenna from the phased array antenna 105 used by the satellite 102 for communicating with the UE 110. However, other types of communication links are also contemplated for implementing the UT-SAT link, for example, other bands or other types of links including optical links. Moreover, while only one user terminal 112 and three satellites 102 are illustrated, satellite telecommunications system 100 may include millions of user terminals 112 and many thousands of satellites 102, and different ones of the user terminals 112 and satellites 102 may use different types of communication links to establish the UT-SAT link.

The illustrated communication signal paths in the satellite telecommunications system 100 include a link between the satellite 102, or one of the satellites 102 in the mesh, and the gateway terminal 104, which may be referred to as a SAT-GW link. In the exemplary embodiment, the SAT-GW link is implemented as a Ka-band radio frequency (RF) link. For example, the gateway terminal 104 and each of the satellites 102 may include a parabolic antenna for transmitting and receiving RF signals in the Ka band. However, other types of communication links are also contemplated for implementing the SAT-GW link. For example, the satellites 102 may also include laser communication terminals, as described below, and the gateway terminal 104 may also include one or more laser communication terminals for communication with the satellites 102 when atmospheric weather conditions are favorable for ground-to-space (and space-to-ground) laser transmission. It should be understood that the gateway terminals 104 can include multiple antennas in any combination of parabolic antennas, laser communication terminals, or other type of communication links. Moreover, while only one gateway terminal 104 and three satellites 102 are illustrated, satellite telecommunications system 100 may include hundreds of gateway terminals 104 and many thousands of satellites 102, and different ones of the gateway terminals 104 and satellites 102 may use different types of communication links to establish the SAT-GW link.

The illustrated communication signal paths in the satellite telecommunications system 100 may further include links between respective pairs of the satellites 102 in the satellite mesh topology 107, which may be referred to as SAT-SAT links. In the exemplary embodiment, the SAT-SAT links are implemented as optical frequency links, or simply "optical" or "laser-based" links. For example, each of the satellites 102 also includes one or more laser communication terminals for transmitting and receiving laser-based (e.g., optical) signals. The laser communication terminals may be dynamically oriented with respect to the satellite 102 on which they are mounted to enable the laser communication terminals of each satellite 102 to track, and maintain the SAT-SAT links with, other satellites 102 in relative motion with respect to the satellite 102. In the exemplary embodiment, each of the satellites 102 includes multiple laser communication terminals that may be independently oriented to enable each satellite to simultaneously maintain SAT-SAT links with multiple other satellites 102. However, other types of communication links are also contemplated for implementing the SAT-SAT links. Moreover, while only three satellites 102 are illustrated, satellite telecommunications system 100 may include many thousands of satellites 102, and different pairs of the satellites 102 may use different types of communication links to establish the respective SAT-SAT link between them. Additionally, one or more of the satellites 102 may not be configured to establish SAT-SAT links with other satellites 102.

In some instances, communications between the UE 110 and the cellular core 141 may be routed through a particular satellite 102 via a UE-SAT link, and through that same satellite directly to and from the gateway terminal 104 via a SAT-GW link, as shown in path A, without being routed through any other satellites 102. In other words, in some instances it is not necessary for the satellite 102 to utilize or maintain SAT-SAT links with other satellites, or even to be capable of establishing SAT-SAT links with other satellites, for the satellite telecommunications system 100 to route communications between the UE 110 and the gateway terminal 104. In other instances, communications between the cellular core 141 and the UE 110 having a UT-SAT link with the particular satellite 102 may be routed through a different satellite 102 that has established a SAT-GW link with the gateway terminal 104, as shown in path B, using one or more SAT-SAT links between the satellites 102 in the satellite mesh topology 107.

In the exemplary embodiment, satellite telecommunications system 100 also includes satellite operations ("SatOps") services 130 connected to the cellular core 141 from a centralized location. In the exemplary embodiment, the cellular core 141 is connected to the centralized SatOps services 130 via the private backbone 126. The SatOps services 130 may transmit various operational and management instructions to the cellular core 141 and the gateway terminal 104, as well as to the satellites 102 (via the gateway terminal). The SatOps services 130 may transmit various operational and management instructions to the cellular core 141.

The gateway terminal 104 may also be connected to a point-of-presence (POP) 140 on the one or more ground-based IP networks 120. For example, a dedicated PoP 140 may be assigned to each gateway terminal 104, and may be physically wired to the gateway terminal 104. In some cases, multiple gateway terminals 104 at a same site can be connected to a same PoP 140. Additionally or alternatively, different gateway terminals 104 at a same site can be connected to different PoPs 140. The POP 140 may access data from the ground-based IP network 120 (e.g., from one or more servers 150) and provide the data back through the satellite telecommunications system 100 to the user terminal 112 and network device 114. In the exemplary embodiment, each gateway terminal 104 is associated with a corresponding Pop 140, and the POP 140 is connected to the centralized SatOps services 130 via the private backbone 126. The SatOps services may transmit various operational and management instructions to the gateway terminal 104, as well as to the satellites 102 (via the gateway terminal) and to the user terminals 112 (via the gateway terminal and the satellites).

In some embodiments, the PoP 140 corresponding to each gateway terminal 104 may be implemented on a common hardware platform with the cellular core 141 corresponding to that gateway terminal 104. However, separate hardware implementations of the POP 140 and the cellular core 141 are also contemplated.

Satellite Constellation

For global coverage having reduced latency, satellite telecommunications system 100 employs non-geostationary satellites, and more specifically low-Earth orbit (LEO) satellites 102. Geostationary-Earth orbit (GEO) satellites orbit the equator with an orbital period of exactly one day at a high altitude, flying approximately 35,786 km above mean sea level. Therefore, GEO satellites remain in the same area of the sky as viewed from a specific location on Earth. In contrast, LEO satellites orbit at a much lower altitude (typically less than about 2,000 km above mean sea level), which reduces Earth-satellite signal travel time and therefore reduces communication latency relative to GEO satellites.

However, a stable low-Earth orbit necessarily corresponds to a much shorter orbital period as compared to GEO satellites. For example, at a particular altitude, a LEO satellite 102 may orbit the Earth, for example, once every 95 minutes. Further in the exemplary embodiment, the low-Earth orbits of satellites 102 are prograde. Therefore, LEO satellites do not remain stationary relative to a specific location on Earth, but rather advance generally eastward with respect to the Earth's surface. In addition, the lower orbital altitude means that, as compared to a GEO satellite, a LEO satellite has a more limited line of sight. For example, a LEO satellite in an equatorial orbit would not have a "line of sight" for direct communication with user terminals or gateway terminals at middle or upper latitudes on Earth, such as at locations L1 (corresponding to Los Angeles, California) and L2 (corresponding to Seattle, Washington) identified in FIG. 2.

Figure 2:
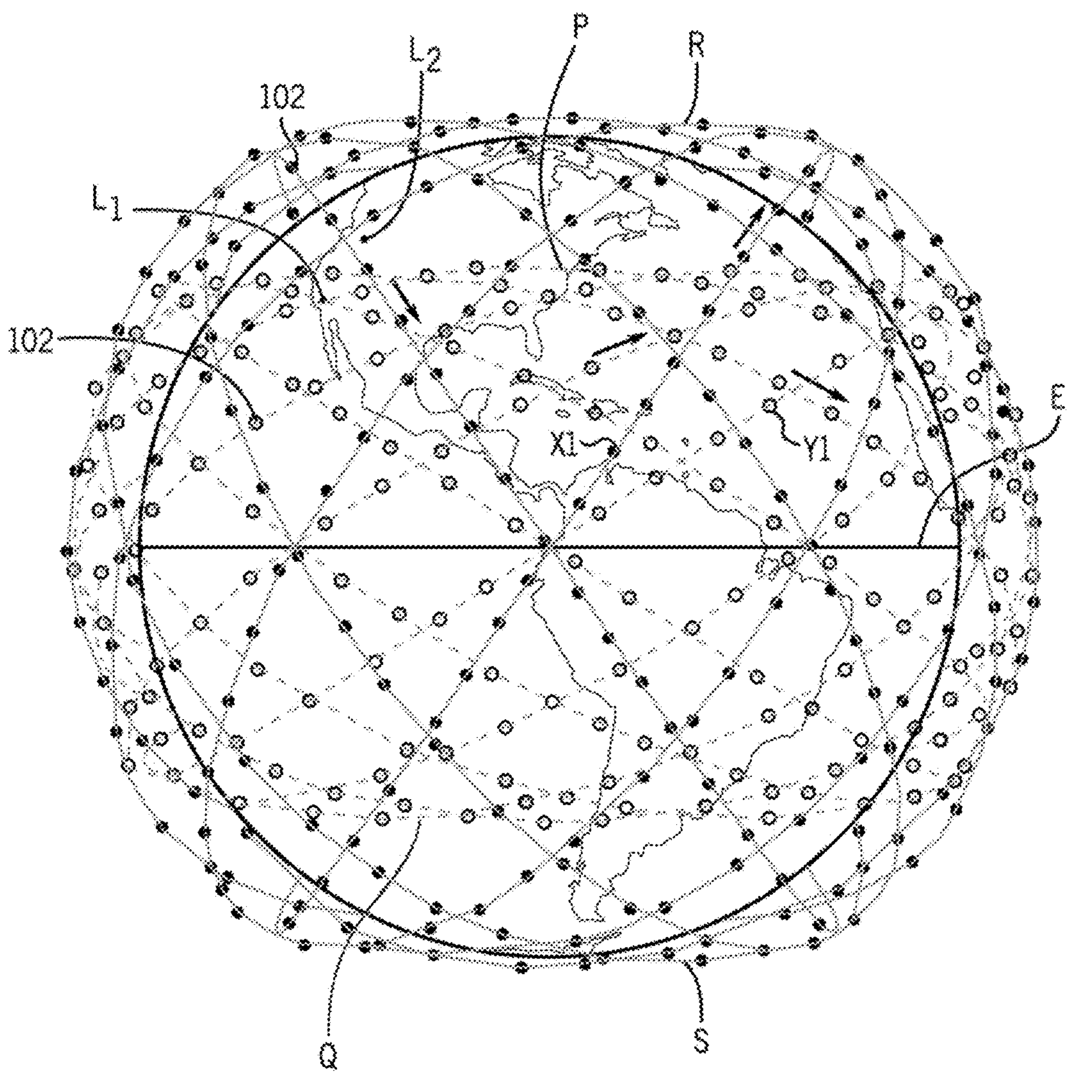
FIG. 2 is a schematic showing exemplary planar orbital patterns of a group of satellites, which may be used in the satellite telecommunications system of FIG. 1A, around a rotating Earth in accordance with embodiments of the present disclosure.

Accordingly, satellite telecommunications system 100 may include a large number, for example several thousand, satellites 102 arranged in a constellation of inclined orbits that ensures that at least some satellites 102 are always crossing the sky within range of user terminals 112 at any given Earth latitude and longitude. One non-limiting embodiment is illustrated in FIG. 2, which is a schematic showing an example of satellite planar orbital patterns X1 and Y1 of satellites 102 around a rotating Earth. In FIG. 2, the satellites in pattern X1 are represented by closed circles, and the satellites in pattern Y1 are represented by open circles, with arrows illustrating a general direction of travel of the satellites in each string. Each satellite string may include a number of equally spaced or substantially equally spaced satellites 102. More specifically, in a frame that rotates with the Earth, satellites 102 in the first string X1 are in discrete orbits sharing a first inclination, and satellites 102 in the second string Y1 are in discrete orbits sharing a second inclination different from the first inclination.

The angle of inclination of the satellites typically corresponds to an upper and lower limiting Earth latitude (indicated as P and Q for satellite string X1, and as R and S for satellite string Y1) of the orbital paths of the satellites. Although two strings at different inclinations are illustrated, other numbers of strings, such as one string or more than two strings, are also contemplated. Moreover, the illustrated angles of inclination are examples, and other angles of inclination for a single string or for multiple strings are also contemplated. Orbital patterns X1 and/or Y1 may be designed as repeating ground track systems, or may have a drifting pattern relative to the Earth's rotation rate.

Due to the inclination of the orbits, in addition to the general eastward motion of the satellites relative to the Earth's surface, each satellite 102 spends half its orbital period ascending from south to north over the Earth's surface, and the other half of its orbital period descending from north to south.

Ground Terminal Mesh Topology

Figure 3:
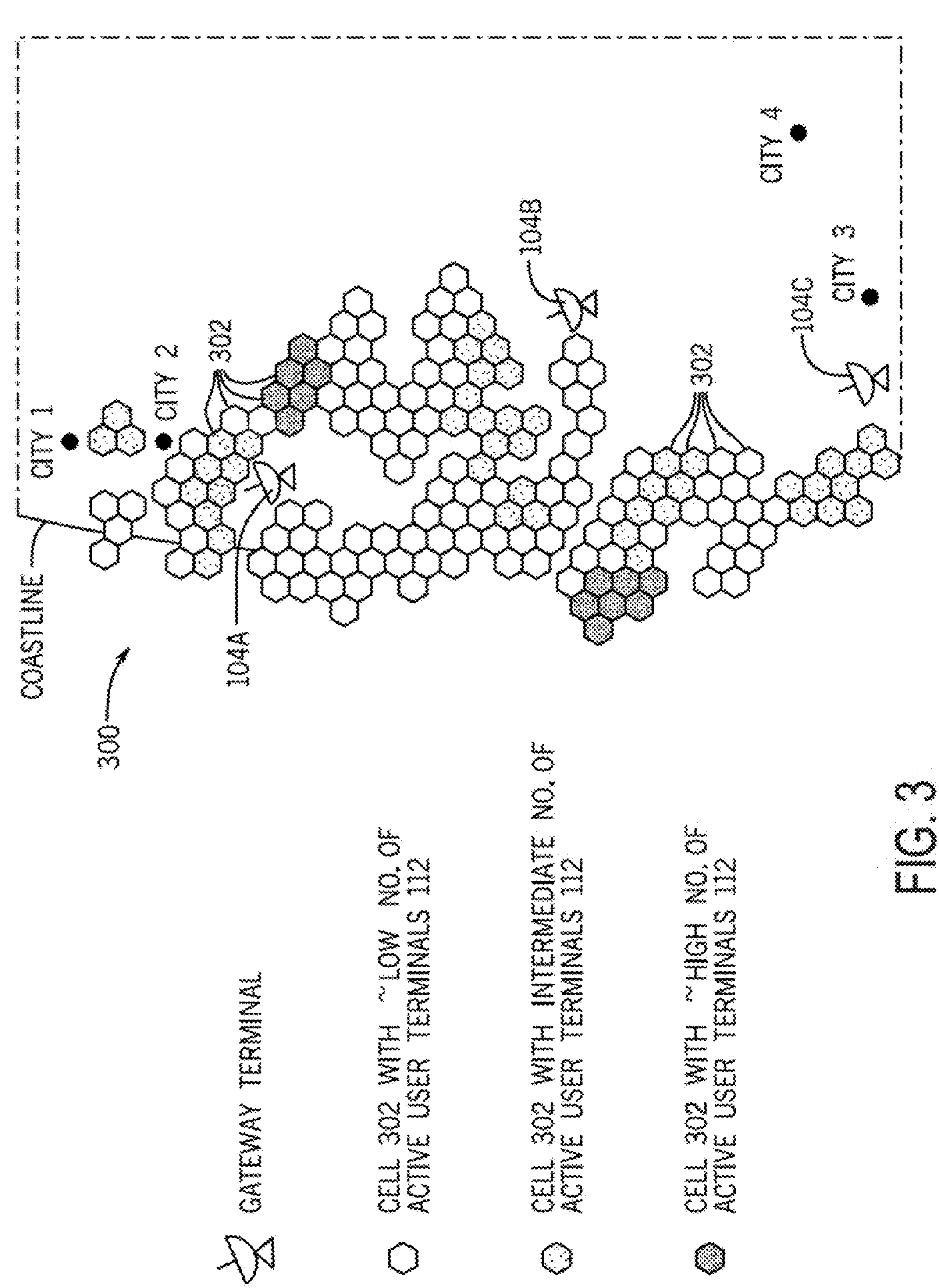
FIG. 3 illustrates a not-to-scale aerial view of an exemplary ground area that may be provided Internet service by the satellite telecommunications system of FIG. 1A, including user terminals grouped into Internet service cells, and gateway terminals.
Figure 4:
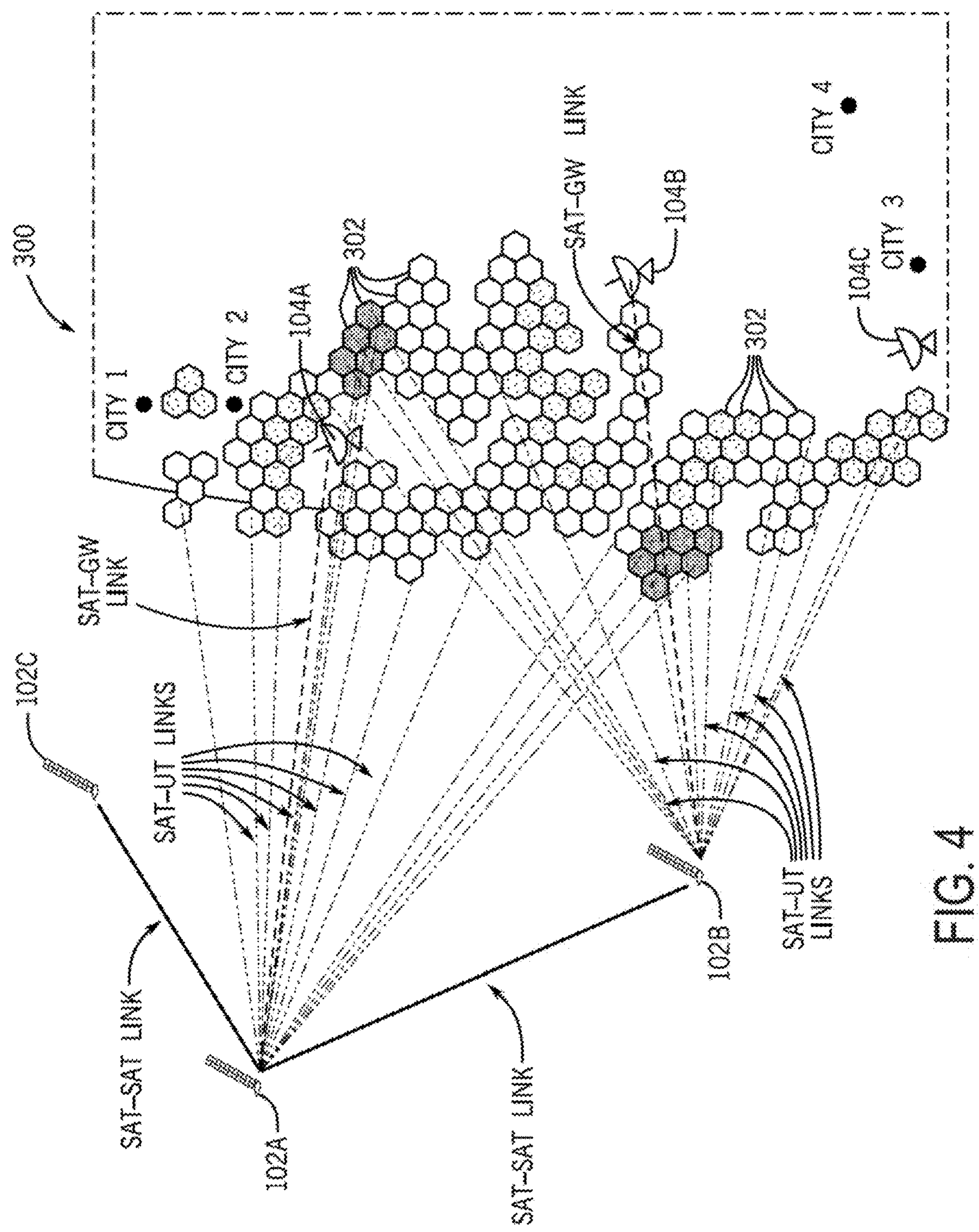
FIG. 4 illustrates a not-to-scale aerial view of the ground area shown in FIG. 3 being serviced by certain exemplary satellites of the group in communication with the user terminals and the gateway terminals.
Figure 5:
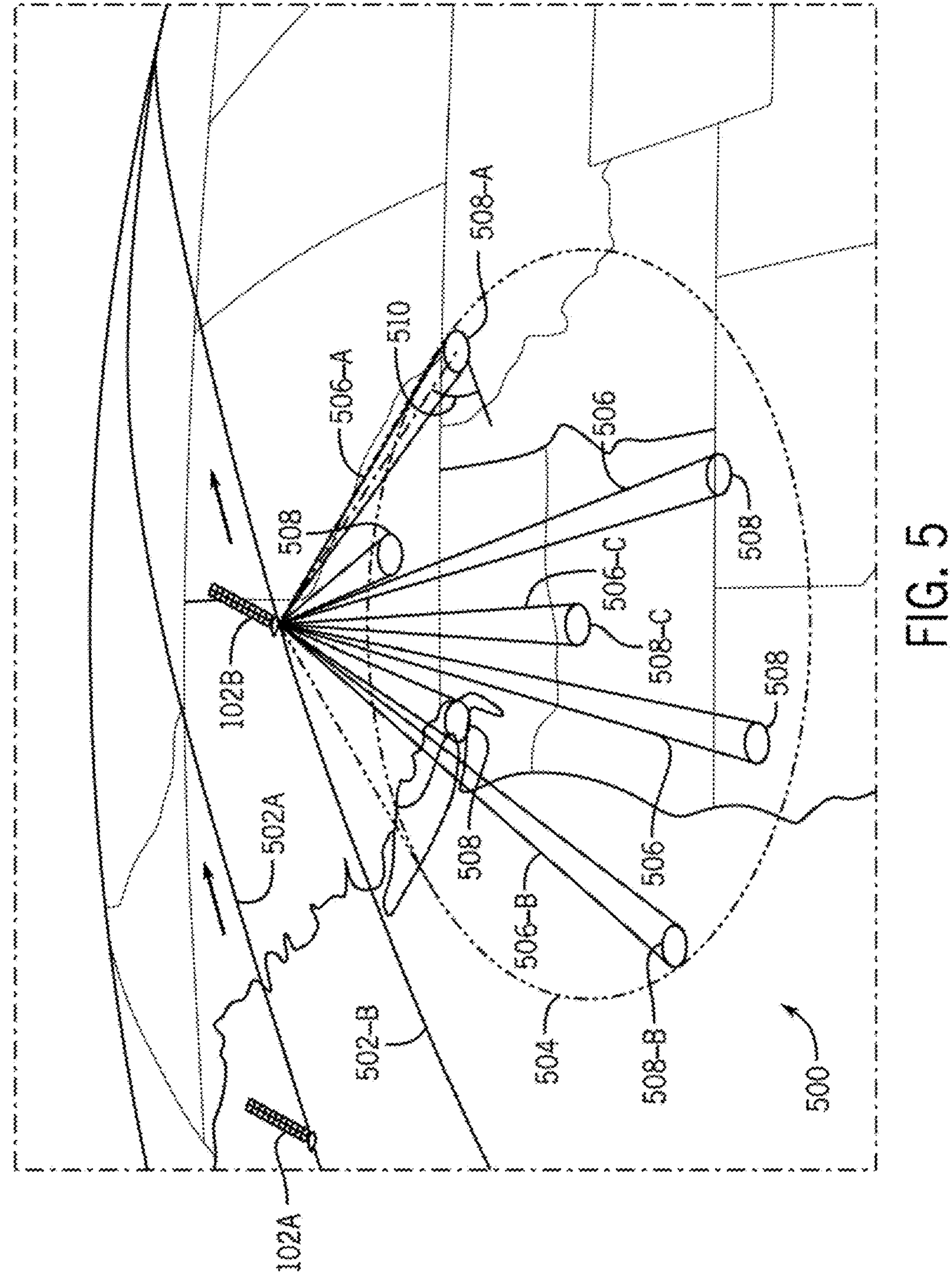
FIG. 5 illustrates a not-to-scale aerial view of an exemplary ground area that may be provided cellular communications service by the satellite telecommunications system of FIG. 1A, including beams and beam footprints of one of the satellites, in accordance with embodiments of the present disclosure.

FIG. 3 illustrates a not-to-scale aerial view of an exemplary ground area 300 that may be serviced by the satellite telecommunications system 100. More specifically, the ground area 300 may include a number of user terminals 112 that may transmit requests for user data to be serviced ultimately by, e.g., server 150 (shown in FIG. 1B) or other data sources on the ground-based IP network 120. The requests for user data, and the data responsive to the requests, may be routed to and from the user terminals via the POP 140 through the network topology of the satellite telecommunications system 100. FIG. 4 illustrates a not-to-scale aerial view of requests from, and responses to, ground area 300 via the ground-based IP network 120 being serviced by example satellites 102A, 102B, and 102C of the group of satellites 102 in communication with example gateway terminals 104A, 104B, and 104C. FIG. 5 illustrates a not-to-scale aerial view of an exemplary ground area 500 that may simultaneously be provided cellular communications service via the cellular core 141 of the satellite telecommunications system 100, including representative beams 506 and beam footprints 508 of one of the satellites 102. For example, access to the cellular core 141 may be provided to UE 110 via a first phased array antenna carried by at least a subset of the satellites 102, and access to the ground-based IP network 120 may be simultaneously provided to the user terminals 112 via a second phased array antenna carried by the satellites 102 that is physically separate from the first phased array antenna. However, embodiments are also contemplated in which the satellite telecommunications system 100 provides cellular communications service to UE 110 via the cellular core 141, but does not support separate access to the ground-based IP network 120 by user terminals 112 via the POP 140.

The network topology of the satellite telecommunications system 100 may be analogized to a map of roads (travel routes) interconnecting a group of cities (nodes). For road travel between two cities separated by a significant distance, several different road routes may be available, each using roads that connect a different set of intermediate cities. One must know which intermediate cities are connected by roads, and how much traffic there will be on each road, in order to select the best travel route between the two cities.

Similarly, for data travel between two nodes in the satellite telecommunications system 100 (e.g., between a UE 110 and a terrestrial telecommunications provider 200, or between a user terminal 112 and a data source on the ground-based IP network 120 (shown in FIG. 1B)), several different network routes may be available, each using links that connect a different set of intermediate nodes (i.e., satellites and gateways). One must know which satellites are within the field of view of the UE 110 or user terminal 112, which satellites and gateways are connected by data links, and how much traffic there will be on each link, in order to select the best data route between the UE and the cellular core 141 or between the user terminal and the POP 140. The topology of the satellite telecommunications system 100 is more complex than a road map, however, because the "roads" (data communication routing through the mesh topology) must be frequently reconfigured to accommodate the relative motion of the satellites 102 with respect to the UE 110 and the ground terminals 112 and 104, and in some cases the relative motion of the satellites 102 with respect to each other. In some embodiments, the reconfiguration must occur once or more per minute to accommodate the relative motion of the satellites 102.

With reference to FIGS. 3 and 4, in the exemplary embodiment, the ground area 300 includes user terminals 112 grouped into IP service cells 302 that are geographically fixed relative to the Earth. Although each IP service cell 302 is illustrated as a hexagonally shaped area, IP service cells 302 of any shape are contemplated. Moreover, although the IP service cells 302 are illustrated as having a particular size, other sizes of IP service cells 302 are contemplated. IP service cell size may be a function of multiple factors including, but not limited to, altitude of the satellite constellation, number of satellites in the satellite constellation, number of Earth-based user terminals, geography, etc. The ground area 300 also includes one or more gateway terminals 104.

In some embodiments, the user terminals 112 in each IP service cell 302 are further grouped into different network traffic "lanes" within the IP service cell 302. The lanes may be, but need not be, associated with particular geographical subregions within the IP service cell 302. Each combination of an IP service cell 302 and lane may be uniquely identified in the network addressing scheme utilized by the satellite telecommunications system 100, such that all user terminals 112 in a specific IP service cell and lane can be addressed as a group. For example, if the network addressing scheme is structured similar to Internet Protocol (IP) addressing, each IP service cell and lane may be associated with a unique network address prefix.

In some embodiments, each user terminal 112 is configured to address requests for user data to a particular PoP 140 on the ground-based IP network 120, which may be referred to as the "home" POP for the user terminal. In some embodiments, the user terminals 112 are assigned to a "home" PoP 140 on a per-service cell or per-lane basis. The home PoP 140 may be assigned based on a physical proximity of the service cell to the home PoP 140. The approach of assigning home PoPs based on geographic proximity tends to reduce a signal travel time through the satellite telecommunications system 100 for the requests for user data. However, other methods of assigning a "home" PoP 140 to each user terminal for the addressing of requests for user data are also contemplated. The home PoP 140 handles each request for user data by accessing resources on the ground-based network 120 or nodes of the satellite telecommunications system 100 to obtain the requested data, and by accessing the SatOps services 130 to obtain routing instructions for returning the requested data.

With reference to FIGS. 1-4, as a result of the motion of satellites 102 relative to the Earth's surface, a particular satellite 102 may be in a position to establish communication with the user terminals 112 in a particular IP service cell 302 for only a limited time window, such as less than ninety minutes, less than sixty minutes, less than thirty minutes, less than fifteen minutes, less than five minutes, or less than one minute. In the exemplary embodiment, the SatOps services 130 include a topology service 132 that assigns, to each IP service cell 302 (and in some embodiments to each lane within the IP service cell), one or more of the satellites 102 to be available for linking with the user terminals 112 on a slot-by-slot basis, in which each slot represents a period of time. The period of time, i.e., time slot length, may be selected to accommodate the limited time windows over which any particular satellite may be within the field of view of the user terminals in that IP service cell. Time slot length may be a function of orbital velocity of the satellite constellation (which in turn may be a function of altitude of the satellite constellation), number of satellites in the satellite constellation, size of the IP service cells, etc. In the exemplary embodiment, the time slot length is between 10 and 20 seconds inclusive. For example, each time slot may be 15 seconds long. However, other time slot lengths are also contemplated.

The topology service 132 may transmit topology schedule data to the user terminals 112 in each IP service cell 302 on a regular basis (e.g., via the gateway terminal 104 and the satellite 102 that are currently in communication with the IP service cell 302 associated with the respective user terminal 112). The topology schedule data transmitted to the user terminals specifies one or more of the satellites 102 that will be available for connectivity to the respective user terminal 112 during one or more future time slots. The topology schedule data may also include pointing instructions for the phased array antenna of the user terminal (or for the appropriate antenna for other types of UT-SAT links) needed to establish and maintain the corresponding UT-SAT link during the time slot, as derived from data provided by the node status service 134 for the relative motion of the satellite and the user terminal. In conjunction with the arrival of the future time slot, the user terminal 112 initiates a UT-SAT link with one of the satellites 102 specified by the topology schedule data for that time slot. In the exemplary embodiment, the SatOps services 130 also includes a steering service 136 that is programmed to manage the routing of the many data requests from, and responses to, user terminals 112 through the network topology of the satellite telecommunications system 100.

The timing of the regular transmission of the topology schedule data to the user terminals may be selected to balance several factors. For example, transmitting the topology schedule data for each time slot well in advance of the arrival of the future time slot helps to ensure that the topology schedule data propagates through the gateways and satellites to the user terminals in time to enable the user terminals to re-orient their respective phased array RF beams when the future time slot arrives. On the other hand, transmitting the topology schedule data for each time slot a relatively short time in advance of the arrival of the future time slot enables the topology service 132 to account for more up-to-date satellite and gateway statuses and ground demand data in assigning IP service cells to satellites. For example, the SatOps services 130 may include a node status service 134 that monitors the satellites 102 and gateway terminals 104. The node status service may provide projected satellite orbital positions during future time slots based on the position, velocity, and altitude of each satellite. The node status service may also provide data indicating Internet connectivity and performance of the POP 140 associated with each gateway terminal 104, and/or data indicating weather-based signal attenuation prediction data for each gateway site. The node status service 134 may further evaluate the health and operability of each satellite and gateway, for example, by tracking a slew rate and alignment performance of each parabolic antenna of the satellite or gateway to determine a current capability of the parabolic antenna to establish and track links. Other types of health and/or status monitoring of the nodes in satellite telecommunications system 100 are also contemplated. The topology service 132 may be programmed to avoid assigning a potential link between nodes if the node status data suggests the link would be unreliable. Additionally or alternatively, the topology service 132 may be programmed to assign a reliability label to a link between nodes if some node status data suggests the link would be unreliable during one or more time slots, and to include the reliability label in data provided to the steering service 136, so that the steering service 136 can take the potential unreliability of the link into account for data routing decisions during the one or more time slots.

In some embodiments, the factors involved in advance transmission timing for the topology schedule data may be balanced advantageously by regularly transmitting the topology schedule data to the user terminals in each IP service cell at an advance transmission time of five to ten minutes in advance of the one or more future time slots associated with the topology schedule data. However, other advance transmission times are also contemplated.

As discussed above with respect to user terminals, a particular satellite 102 also may be in a position to establish communication with a particular gateway terminal 104 for only a limited time window. In the exemplary embodiment, the topology service 132 also assigns each satellite 102 to one of the gateway terminals 104 on the slot-by-slot basis. The topology service 132 may transmit topology schedule data to the gateway terminals and to the satellites on a regular basis (e.g., via the gateway terminal 104 that is currently in communication with the respective satellite 102). The topology schedule data specifies an expected connectivity between each gateway terminal 104 and one or more satellites 102 during one or more future time slots. The topology schedule data transmitted to each satellite 102 may also include pointing instructions for the parabolic RF antenna of the satellite (or for the appropriate antenna for other types of SAT-GW links), and likewise the topology schedule data transmitted to each gateway terminal 104 may also include pointing instructions for the parabolic RF antenna of the gateway terminal (or for the appropriate antenna for other types of SAT-GW links), needed to establish and maintain the corresponding SAT-GW link during the time slot, as derived from data provided by the node status service 134 for the relative motion of the satellite and the gateway terminal. In conjunction with the arrival of the future time slot, the satellite 102 initiates a SAT-GW link with the gateway terminal 104 specified by the topology schedule data for that time slot.

For example, as illustrated in FIG. 4, three satellites 102A, 102B, and 102C are approaching ground area 300 at the start of a particular time slot. The IP service cells 302 in the ground area have varying numbers of active user terminals 112. The user terminals 112 in each IP service cell 302 have previously received topology schedule data for the particular time slot, specifying satellites 102A, 102B, and 102C as being available for UT-SAT links during the particular time slot. Accordingly, in conjunction with the arrival of the time slot, the various user terminals 112 in ground area 300 establish respective links with satellite 102A, 102B, or 102C for communication with satellite telecommunications system 100.

Because the user terminal 112 may independently determine which satellite to establish a UT-SAT link with, the SatOps services 130 does not know in advance which satellite 102 will be in communication with which user terminal 112. In some embodiments, each time a user terminal 112 successfully establishes a new UT-SAT link with one of the satellites 102, the SatOps services 130 associates, in a memory, the user terminal with the lane of network traffic corresponding to the current linked satellite. The SatOps services 130 provides that association as part of the network data to the steering service 136, to enable data routing through the proper current network lane back to the user terminal.

Similarly, the satellites 102A, 102B, and 102C have previously received topology schedule data for the particular time slot shown in FIGS. 3 and 4. The topology schedule data can specify, for each satellite, one of the gateway terminals 104A, 104B, and 104C for SAT-GW links during the particular time slot. Accordingly, in conjunction with the arrival of the time slot, the various satellites 102 establish respective SAT-GW links with gateway terminals 104A, 104B, and 104C for communication with satellite telecommunications system 100.

Satellite Mesh Topology

The term "satellite mesh topology" refers specifically to the network interconnectivity among the group of satellites 102 as nodes within the overall mesh network, and the configuration of the satellite mesh topology 107 changes dynamically over time in the satellite telecommunications system 100 to account for relative motion among the satellites 102 and other factors.

One factor that affects the satellite mesh topology 107 is that each satellite 102 can only link directly to a limited number of other satellites 102 at any given time, due to each satellite 102 having a finite number of laser communication terminals (and/or other SAT-SAT communication devices). In other words, at any given time, each satellite 102 is capable of establishing a direct network connection to only a few other satellites 102 out of potentially thousands of satellites in the constellation. In one embodiment, each satellite 102 has five laser communication terminals available to link to other satellites 102. However, embodiments in which one or more of the satellites 102 has a different number of laser communication terminals (or a different number of other SAT-SAT communication devices) are also contemplated.

In the exemplary embodiment, the topology service 132 assigns SAT-SAT links among pairs of satellites 102 on the slot-by-slot basis. The topology service 132 may include the link assignments in the topology schedule data transmitted to each satellite 102 on the regular basis, as discussed above (e.g., via the gateway terminal 104 currently in communication with the respective satellite 102). More specifically, the topology schedule data may specify a connectivity of the respective satellite 102 to other satellites in the satellite mesh topology 107 during the one or more future time slots. The topology schedule data may also include pointing instructions for each of the satellite's laser communication terminals (or for the appropriate antenna for other types of SAT-SAT links) needed to establish and maintain the specified SAT-SAT links during the time slot, as derived from data provided by the node status service 134 for the relative motion of the pair of satellites. In conjunction with the arrival of the future time slot, the satellite computer system 103 dynamically establishes SAT-SAT links with the other satellites specified by the topology schedule data for that time slot, as well as the SAT-GW link with the gateway terminal 104 specified for that time slot.

As noted above, the topology service 132 may be programmed to transmit the SAT-SAT link topology schedule data to the satellites on the same regular basis, such as five to ten minutes in advance of the one or more future time slots, as is used to transmit general mesh topology schedule data to the nodes. However, other advance transmission times are also contemplated.

Cellular RF Beam Mapping

Returning to FIG. 5, as noted above, the satellites 102 may also provide cellular communications service to the ground area 500 via the cellular core 141 of the satellite telecommunications system 100. The ground area 500 may be co-extensive with, or overlap, the ground area 300 in which user terminals 112 are serviced. For example, access to the cellular core 141 may be provided to UE 110 via a first phased array antenna 105 (shown in FIG. 1B) carried by at least a subset of the satellites 102, and access to the ground-based IP network 120 may simultaneously be provided to the user terminals 112 via a second phased array antenna (not shown) carried by the satellites 102 that is physically separate from the first phased array antenna. Alternatively, the ground area 500 may not overlap with ground area 300 or may not include any user terminals 112 serviced by the satellites 102. In some embodiments, for example, the satellites 102 support access to the cellular core 141 by UE 110 in the ground area 500, but do not support separate access to the ground-based IP network 120 by user terminals 112.

In particular, in FIG. 5, satellites 102 A and 102B are moving generally northeast over the ground area 500 along respective orbital paths 502A and 502B, with the satellite 102A slightly behind and to the north of the satellite 102B. As shown in FIG. 4, three gateway terminals 104A, 104B, and 104C are available to establish SAT-GW links with the satellites 102A and 102B as they pass over the ground area 500, and each satellite 102A and 102B may establish a SAT-GW link for each time slot as directed by the topology schedule data.

In the exemplary embodiment, each of the satellites 102 implements a base station platform that supports multiple cells, and the carrier for each cell is implemented by a corresponding RF beam 506 of the phased array antenna 105. For example, in a 4G LTE implementation, the satellite base station platform is an eNodeB that supports up to 256 cells (also referred to as sectors), and the phased array antenna 105 (or, optionally, plurality of phased array antennas 105) of the satellite generates up to 256 separate directional RF beams 506 as the carriers for each cell (although only seven beams 506 are illustrated in FIG. 5 for clarity of illustration). However, other numbers of beams/cells per satellite 102 are also contemplated, either in a 4G LTE implementation or other RAN implementations. Each beam 506 intersects the surface of the Earth at a centerline incidence angle 510 and has a corresponding beam footprint 508 at or near the surface. The beam footprint 508 defines a service area of the cell, such that UE 110 in the beam footprint 508 are able to access the satellite telecommunications system 100 using the corresponding beam 506. The eNodeB implemented by the satellite can route communications with the UE 110 in each beam footprint through the satellite's current SAT-GW link, or alternatively through the satellite mesh topology 107 to another satellite's SAT-GW link, to the cellular core 141, as shown in FIG. 1B.

As the satellite 102B passes over the ground area 500, the position of each UE 110 on the surface constantly changes relative to the position of the satellite 102B. In the exemplary embodiment, the topology service 132 of the SatOps services 130 includes a cellular planning component programmed to compensate for the relative motion of the satellites in order to ensure continued connectivity of the UE 110. For example, at the moment in time illustrated in FIG. 5, the satellite 102B has a field of regard 504, which is an area that the phased array antenna 105 can potentially reach with directional beams 506. The beams generated by the satellite include a forwardmost beam 506-A with a footprint 508-A, a rearmost beam 506-B with a footprint 508-B, and a nadir beam 506-C with a footprint 508-C. (Additional beams generated by the satellite are not illustrated in FIG. 5 for purposes of clarity of illustration.) As the satellite 102B moves onward, if there is no adjustment in the direction of emanation of the beams 506 from the satellite 102B, the beam footprint 508-A will move away from the UE 110 that were communicating via the beam 506-A, the beam footprint 508-B will move away from the UE 110 that were communicating via the beam 506-B, and the beam footprint 508-C will move away from the UE 110 that were communicating via the beam 506-C.

In some embodiments, in order to provide continued connectivity to the UE 110 in each geographic sub-area of the ground area 500, the beams 506 may be re-directed (that is, the beam angle from the phased array antenna 105 may be changed) to keep the footprint 508 on the same geographic sub-area as the satellite 102B moves along the path 502. This may be referred to as "sliding" or steering the beams. For example, the incidence angle 510 of the beam 506-A would steadily approach 90 degrees as the satellite 102 moves towards a position directly over the geographic sub-area covered by beam footprint 508-A in FIG. 5, and then continue to grow steadily past 90 degrees towards 180 degrees as the satellite moves away to the northeast, such that the beam footprint 508-A remains located on the same geographic sub-area throughout the pass through the satellite's field of regard 504.

Additionally or alternatively, the beams 506 may be held at a constant beam angle from the phased array antenna as the satellite 102B moves overhead, and communication with the UE 110 may be handed over to a different beam 506 with a footprint 508 that moves over the geographic sub-area as the footprint of the initial beam leaves the sub-area. This may be referred to as "gliding" the beams. For example, the geographic sub-area initially covered by beam footprint 508-A (at the instant in time shown in FIG. 5) would eventually be covered by beam footprint 508-C as the satellite moves directly overhead, and then covered by beam footprint 508-B just before the geographic sub-region is left behind by the field of regard 504 as the satellite 102B moves away. (The geographic sub-area would also be covered by intermediate beam footprints 508 distributed between footprints 508-A and 508-C, and between 508-C and 508-B, associated with beams 506 that are not included in FIG. 5 for purposes of clarity of illustration.) The UE 110 in that geographic sub-area may be handed over to the next following beam in sequence as each successive beam footprint covers the sub-area. As the final footprint 508-B for the satellite leaves the geographic sub-area, the UE 110 in the sub-area may next be handed over to a beam of the next following satellite 102A in the group of satellites 102, and so forth.

In some gliding beam implementations, the satellites 102 may utilize one or more standard handover procedures associated with the RAN implementation to pass the UE 110 in the geographic sub-area from beam to beam as the satellites move overhead. For example, each beam originating from a satellite defines a cell of the same base station platform, and handovers between beams of the same satellite 102 (i.e., intra-satellite handovers) may be accomplished without involvement of the cellular core 141. Likewise, the beams from different satellites communicating with the same cellular core 141 are defined as cells of the same RAN, and within-network handover procedures may be used. In a 4G LTE implementation, such handovers may be accomplished using the X2 or S1 interfaces. In some embodiments, the topology service 132 may use a dynamic combination of sliding and gliding beams to meet requirements for cellular services requested by UE 110 within the ground area 500, under constraints imposed by the network topology considerations discussed above and, in some cases, by a concomitant need to meet independent data flow requirements to and from user terminals 112 using the same satellites 102 and gateway terminals 104.

More specifically, the topology service 132 may allocate a direction and power of the available beams of the phased array antenna 105 of each satellite 102 on the slot-by-slot basis, as discussed above, to ensure sufficient coverage of active UE 110 in the geographic sub-areas within the field of regard 504 during the time slot. In some embodiments, the topology service 132 may also ensure that the network topology for the time slot includes sufficient backhaul capacity for cellular communications data from the satellites 102 through the gateway terminals 104 (potentially using the satellite mesh topology 107 as an intermediate link) to the cellular core 141. The topology service may transmit, via the gateway terminals 104, SAT-GW link instructions, SAT-SAT link instructions, and beam plan instructions for each time slot to the satellites 102 as part of the topology schedule data. The beam plan instructions may be used by the satellite computer system 103 to command the phased array antenna 105 to generate the beams 506 during each time slot in accordance with the beam direction and power allocations determined by the topology service 132.

Satellite Effects on Cellular Signal Latency and Doppler Shift

Figure 6:
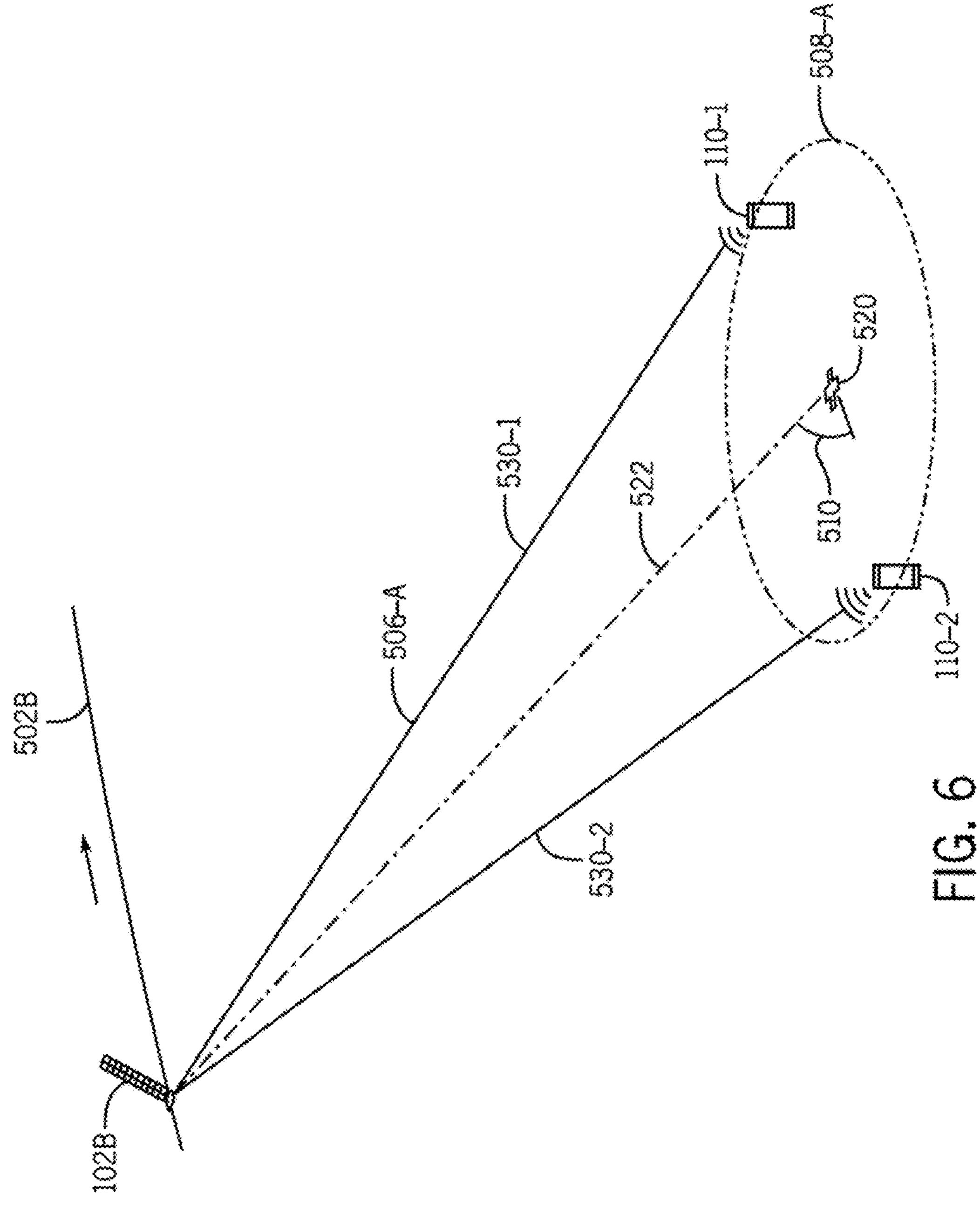
FIG. 6 illustrates a not-to-scale schematic diagram of a geometry of one of the beams and beam footprints of FIG. 5 in accordance with embodiments of the present disclosure.

FIG. 6 illustrates a not-to-scale schematic diagram of a geometry of beam 506-B and beam footprint 508-B from FIG. 5. With reference to FIGS. 5 and 6, beam 506-B is the RF carrier for one of the cells of the base station platform on the satellite 102B, and the footprint 508-B defines a service area of the cell, as noted above.

Under typical RAN protocols such as 4G LTE and 5G NR, as users move throughout the coverage area of a cell, UE transmission timing is controlled by the network through procedures defined by the RAN standard so that uplink signals from all UE 110 in the service area of a cell arrive at the base station at approximately the same time. For example, the uplink signals all arrive within the cyclic prefix duration. (As understood by those of ordinary skill, a cyclic prefix (CP) is appended before a data symbol and is an identical copy of a last portion of the data symbol, generally in order to facilitate avoidance of data loss during transmission. The CP duration is defined by the standard.) In addition, the timing offset between uplink/downlink frame N at the base station remains constant (typically close to zero). The base station instructs the UE to time UE transmissions so that an uplink frame N from the UE arrives at the base station aligned in time based on when the transmission of the corresponding downlink frame N from the base station to the UE occurs. This is referred to as the downlink-uplink subframe offset in some protocols.

Typical RAN protocols are designed for terrestrial applications where the base station is stationary and the UE 110 are expected to be within a threshold distance of the base station. For example, with respect to signal latency, the 4G LTE and 5G NR standards are designed for a round-trip travel time of a wireless signal from the base station to a UE 110, and back to the base station, of less than 1 millisecond. With respect to Doppler shift, the 4G LTE and 5G NR standards are designed for an extreme case of a UE 110 travelling on a high speed train, where the maximum Doppler could be up to 0.28 parts per million (ppm), which corresponds to about 750 Hz for a carrier frequency of 2.7 GHZ. Typical RAN protocols have been designed to handle downlink frame timing, random access by UE 110, and other procedures up to these levels of signal latency and Doppler shift without sacrificing performance.

In a LEO satellite-based communication system such as satellite telecommunications system 100, due to the relative velocity of the satellite base station in a LEO system over the ground, the signal propagation delay and Doppler shift are much larger than in terrestrial cellular networks, and in addition the ranges over which the propagation delay and Doppler shift vary are much larger. For example, for a UE 110 in the beam footprint 508-A at the instant in time shown in FIG. 5, if the satellite 102B is at an altitude of 525 km and the incidence angle 510 is 37 degrees, the latency for a signal transmitted from the satellite to the UE could be as large as 3 milliseconds and the Doppler shift could be as large as 20 ppm (which corresponds to about 54,000 Hz for a carrier frequency of 2.7 GHZ). Moreover, as the satellite moves along the orbital path 502B, and the geographic sub-area covered by footprint 508-A transitions from the leading edge of the field of regard 504 (as shown in FIG. 5) to directly underneath the satellite 102B, the one-way signal latency from the satellite 102B to the UE 110 in footprint 508-A may be reduced by more than 1 millisecond, and the Doppler shift could change as much as 0.35 ppm per second. Other satellite altitudes and beam incidence angles are also contemplated, and thus other ranges of potential signal propagation latency and Doppler shift values are also contemplated.

In addition to the Doppler effect on carrier frequency, the motion of the satellite 102B during this time causes signals transmitted from the satellite to appear to the UE 110 as arriving compressed in time. For example, after one second a downlink frame boundary within the signal transmitted by the satellite would arrive at the UE 110 approximately 20 microseconds earlier than the UE 110 expected it based on the RAN standard downlink frame timing, and the UE would not be able to decode the signal. Similarly, as the satellite moves away from the UE 110, the downlink frame timing would appear expanded in time, and the UE would not be able to decode the signal.

To counteract these effects, the satellite computer system 103 can use knowledge of the satellite motion with respect to the UE 110, and adjust the symbol rate and frame timing of its transmitted signal, so the signal received by the UE 110 arrives within the limits of the RAN standard being used. In other words, while the satellite 102B is moving towards the geographic sub-area covered by a beam, the satellite computer system 103 can cause the phased array antenna 105 to transmit data on that beam slightly expanded in time; likewise, when the satellite 102B is moving away from the geographic sub-area covered by the beam, the satellite computer system 103 can cause the phased array antenna 105 to transmit data on that beam slightly compressed in time. This is referred to as SFO (sample frequency offset) and delay pre-compensation. The satellite computer system 103 can use a similar approach for processing signals received from the UE 110 ("uplink" transmissions) in the geographic sub-area covered by the beam, referred to as SFO and delay post-compensation.

It should be noted that the effects above are described for a UE 110 at a single location in the beam footprint 508-A, but significant variations in signal latency and Doppler shift may also occur within the footprint of each beam 506. For example, with reference to FIG. 6, the parameter ranges discussed above may apply to a signal 522 received at a UE located at a reference location 520 within the beam footprint 508-A. In the example embodiment, the reference location 520 corresponds to a center of the beam footprint, however, other locations within the beam footprint may alternatively be used as the reference location. There may simultaneously be a first UE 110-1 at a leading edge of the beam footprint receiving a signal 530-1, and a second UE 110-1 at a trailing edge of the beam footprint receiving a signal 530-2. In some non-limiting examples, the radius of the beam footprint 508-A could be in a range from about 20 kilometers (about 12 miles) to about 60 kilometers (about 37 miles). Thus, in addition to the magnitude of the Doppler shift present in signal 522, the difference in the Doppler shift between signals 530-1 and 530-2 could be greater than one ppm for stationary UE 110-1 and 110-2, which corresponds to about plus-or-minus 3,000 Hz for a 2.7 GHz carrier frequency. Moreover, the reference location 520 is assumed to be stationary relative to the Earth. If the UE 110-1 or 110-2 are themselves moving relative to the Earth (for example on a high speed train), and additional residual Doppler shift of up to 750 Hz can be present in the signals received from the UE 110-1 or 110-2. Therefore, even after the satellite computer system 103 applies a Doppler correction to the signals in the beam 506-A based on the Doppler shift at the reference location 520, a significant residual Doppler shift can still be present in signals 530-1 and 530-2.

Moreover, under typical RAN protocols, each UE calibrates its uplink Doppler correction from the downlink signal it receives from the satellite. Accordingly, when UE 110-1 and 110-2 calibrate their respective uplink frequencies, the residual difference in Doppler shift in received signals 530-1 and 530-2 will be multiplied by a factor of two in uplink signals sent by the UE 110-1 and 110-2 (i.e., the uplink frequency will include both the mis-calibration of the uplink frequency due to the residual Doppler shift in the downlink signal 530-1 or 530-2, plus the same physical residual Doppler shift after the uplink is corrected at the satellite for Doppler shift based on the expected reference location value). As a result, the potential residual Doppler shift (after reference-location correction) for signals 530-1 and 530-2 from UE 110-1 and 110-2 can be doubled to about 2.3 ppm, which corresponds to plus-or-minus 6,000 Hz for a 2.7 GHz carrier frequency.

The satellite computer system 103 can be configured to send signal data to, and receive signal data from, the phased array antenna 105 of the satellite 102. Moreover, the satellite computer system 103 can be programmed to implement steps to correct the signal data received from, and transmitted to, the UE 110 via the phased array antenna 105 for the out-of-standard effects caused by the use of the satellites 102 as base station platforms. Encapsulating these corrections within the satellite computer system 103 to bring the signals within the RAN standard avoids any need for modification of the UE 110 to use the satellite telecommunications system 100, and thus enables the UE 110 to switch seamlessly between standard terrestrial base station networks and the satellite telecommunications system 100.

In the example embodiment, the satellite computer system 103 calculates an expected signal propagation delay for signals received from the reference location 520 (e.g., the center of the cell) at a series of points in time, based on the satellite's trajectory relative to the reference location 520, and applies a corresponding timing offset correction for each beam 506 based on its signal path length to the reference location 520. The signal propagation delay among beams 506 differs. For example, as shown in FIG. 5, the signal path length (and hence the propagation delay) for nadir beam 506-C is much shorter than the signal path length for the forwardmost beam 506-A and the rearmost beam 506-B. The satellite computer system 103 can adjust the timing of the data stream for one or more beams to account for the differences in propagation delay corresponding to the signal path lengths. Moreover, the timing offset correction value for each beam may change over time. For example, if the beam is steered to maintain the beam footprint on the same geographic sub-area as the satellite 102 moves towards, over, and then past the geographic sub-area, then the signal propagation latency for signals originating at the reference location 520 continuously changes as the satellite 102 moves towards, over, and then past the reference location 520. The timing offset correction values for each point in time may be calculated in advance, stored, and then applied to the incoming data stream as the point in time arrives. Other implementations of timing offset correction with respect to the cell reference location 520 are also contemplated.

A Doppler shift correction algorithm implemented by the satellite computer system 103 can include an initial beam correction to post-compensate for an expected Doppler shift in signals received from the reference location 520 at a series of points in time, based on the satellite's trajectory relative to the reference location 520, applied to the signals from all UE 110 communicating on the beam 506. The Doppler shift correction algorithm can also include, after the initial correction based on the reference location 520, UE-specific corrections for a residual Doppler shift present in the signal from each individual UE 110, arising from a difference in location or velocity of the specific UE 110 relative to the reference location 520.

In the example embodiment, the satellite computer system 103 calculates, for each beam 506, the expected Doppler shift for signals received from the reference location 520 (e.g., the center of the cell or another appropriate location) at a series of points in time, based on the satellite's motion relative to the reference location 520, and applies a corresponding Doppler correction value to the data stream received from the phased array antenna 105 on that beam to post-compensate for the CFO present in the received signal. In other words, the Doppler correction value based on the reference location is applied across the board to the signals received from all UE 110 communicating on the beam.

The Doppler correction value for each beam may change over time. For example, if the beam is steered to maintain the beam footprint on the same geographic sub-area as the satellite 102 moves towards, over, and then past the geographic sub-area, then the Doppler shift for signals originating at the reference location 520 continuously changes as the satellite 102 moves towards, over, and then past the reference location 520. The Doppler correction values for each point in time may be calculated in advance, stored, and then applied to the incoming data stream as the point in time arrives. For example, for a time window (e.g., several minutes) during which a particular beam 506 is assigned to cover a specific geographic sub-area that includes an assigned cell reference location 520, the Doppler correction values for the reference location 520 can be pre-calculated at 1 millisecond time intervals throughout the time window based on a known position and velocity of the satellite 102 for that time interval. The pre-calculated values for each time interval can be stored, and then retrieved to correct the beam signal arriving during the corresponding time interval. Other implementations of Doppler correction with respect to the reference location 520 are also contemplated.

Notably, as discussed above with reference to FIG. 6, the Doppler correction based on the reference location 520 is typically not sufficient, by itself, to bring the timing offset and Doppler shift for the signals from every UE 110 in the cell within the limits of the RAN protocols, as some UE 110 may still exhibit significant residual Doppler shifts. However, the Doppler correction based on the reference location can be sufficient to simplify additional signal processing at the satellite computer system 103 to correct for the residual frequency offset in the signals from each UE 110 at different locations within the beam footprint relative to the reference location 520, and/or moving with different relative velocities.

Example Implementations of Residual Doppler Shift Correction

Figure 7:
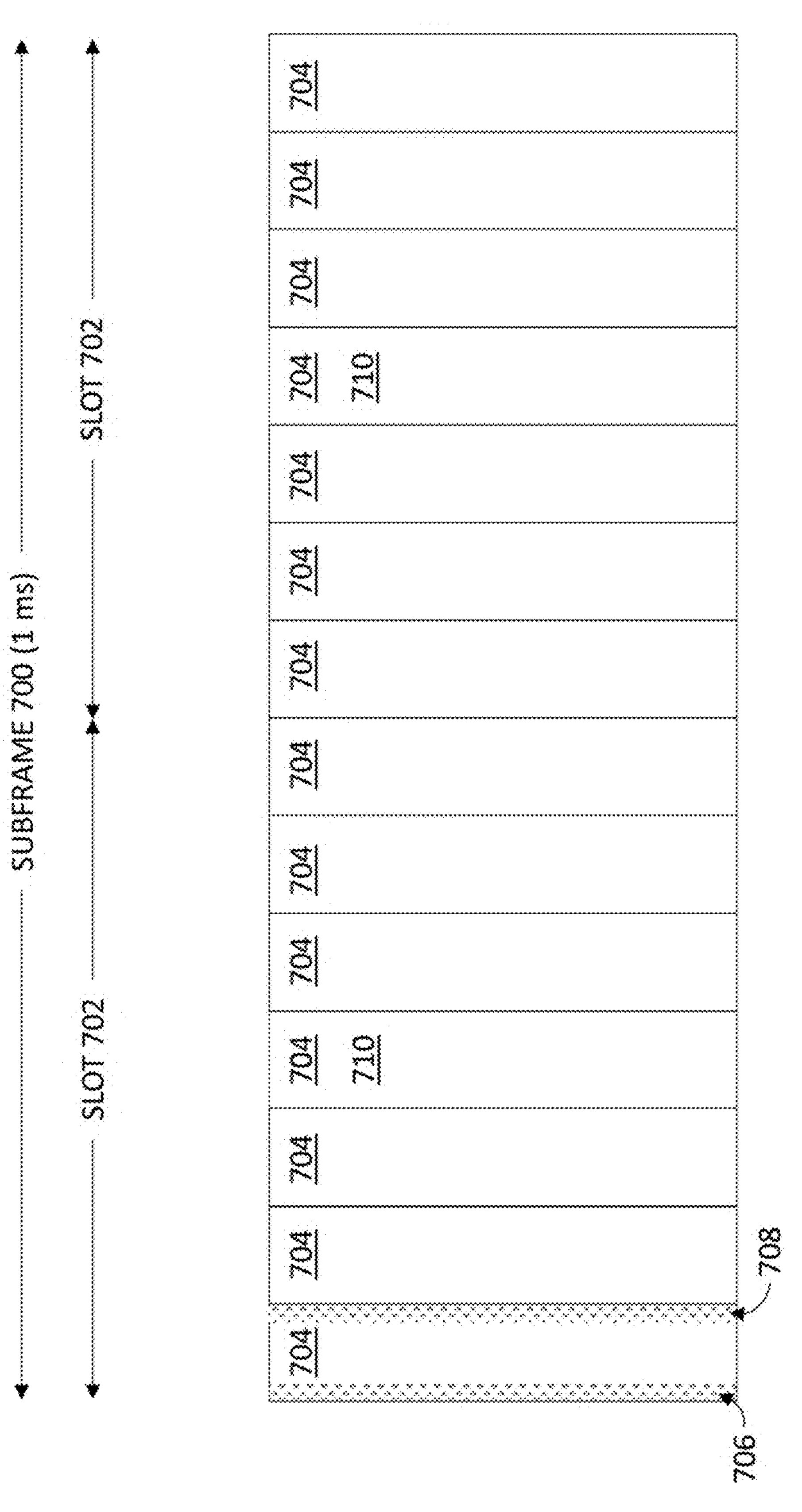
FIG. 7 is a schematic diagram of a subframe that can be used in a RAN protocol in accordance with embodiments of the present disclosure.

FIG. 7 is a schematic diagram of a subframe 700 that can be used in a RAN protocol, such as 4G LTE or 5G NR. Each subframe 700 includes 1 millisecond (ms) of data transmitted by the UE 110 in a defined frequency band, such as a 1.4 mega Hertz (MHz) band or a 5 MHz band. The subframe can be time-divided into two slots 702, and each slot can be time-divided into seven data symbols 704. Other frame structures are also contemplated.

Estimation of Portions of the Residual Doppler Shift Based on Reference Information within a Subframe of the Uplink Signal As noted above, the UE inserts a cyclic prefix (CP) 706 at the beginning of each data symbol 704. The CP 706 is an identical copy of an end portion 708 of the data symbol. Although the CP 706 and the end portion 708 are only illustrated with respect to the first data symbol 704 in FIG. 7, it should be understood that every symbol 704 includes a CP 706 identical to its end portion 708. The RAN protocol typically defines a length of the cyclic prefix 706.

In some embodiments, the satellite computer system 103 is programmed to estimate, for each UE 110 sending data in a beam 506, a residual CFO (i.e., a residual Doppler shift for the UE relative to the Doppler shift for a stationary UE at the reference location 520 of the beam) for the UE 110 based on time domain characteristics of the received signal. For example, using the knowledge that the beginning and ending portions of each symbol 704 should match over the CP length, the satellite computer system 103 can apply standard time-domain correlation techniques to the data samples received from the UE 110 to obtain an estimate of the residual CFO present in the received data. Due to the limited length of the CP and the data sample spacing, such an estimate can be accurate to within a range of about plus-or-minus 7.5 kHz for subframes 700 in the 4G LTE or 5G NR protocols. However, this is still well outside the approximately 750 kHz Doppler shift limit for which these protocols are designed. The estimate based on CP correlation can be referred to as a "coarse" estimate.

Another source of information in the received signal from the UE is the Demodulation Reference Signal (DMRS) 710. For example, the DMRS can be a type of Zadoff-Chu sequence. The base station implemented by the satellite computer system 103 transmits sequence parameters to the UE 110 which determine the sample values of the DMRS. Each UE 110 communicating via a typical RAN protocol transmits the DMRS 710 during certain symbols 704 in each slot 702 allocated to the UE. For example, the DMRS 710 can be present in the center symbol 704 of each slot, as shown in FIG. 7. However, other locations for the DMRS are also contemplated.

Assuming that the residual Doppler shift remains essentially constant over the one millisecond interval of the subframe 700, the DMRS 710 present in each slot 702 in the subframe 700 should match. The satellite computer system 103 can apply standard time-domain correlation techniques to the data samples received from the UE 110 to obtain another estimate of the residual CFO present in the received data. Notably, based on the length of the DMRS data and the separation within the subframe 700 between the symbols 704 that include the copies of the DMRS, such an estimate can be accurate to within a range of about plus-or-minus 1 kHz for subframes 700 in the 4G LTE or 5G NR protocols. This can be referred to as a "fine" estimate of the CFO. However, for a true CFO greater in magnitude than about 1 kHz, the result of correlating the DMRS data simply "wraps around" or shifts back to zero, which masks any residual CFO greater in magnitude than about 1 kHz. In other words, using solely the DMRS correlation, a residual CFO of about 1 kHz would indistinguishable from a residual CFO of about 5 kHz, 3 kHz, −1 kHz, −3 kHz, or −5 kHz.

Figure 8:
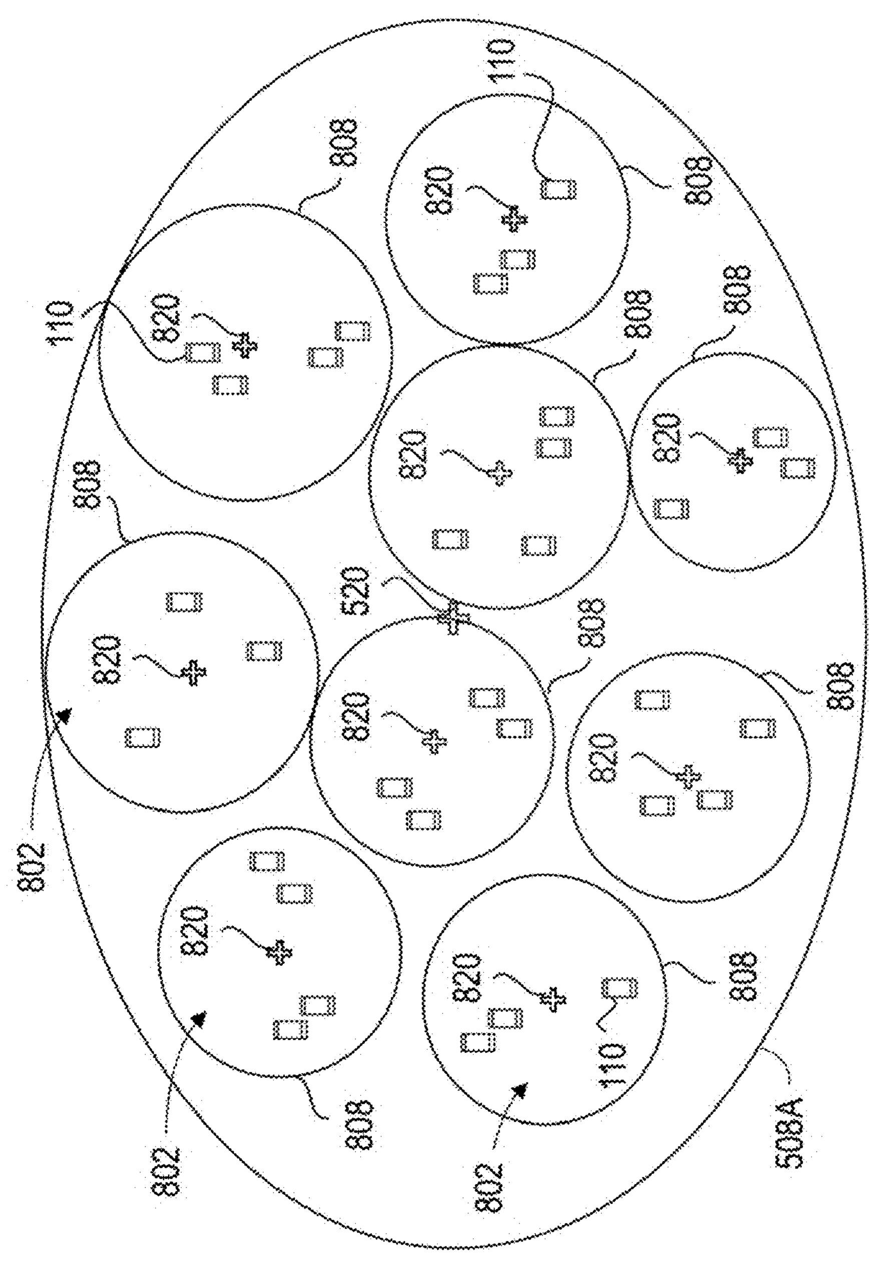
FIG. 8 is a schematic diagram of geographic regions within the beam footprint of FIG. 6 in accordance with embodiments of the present disclosure.
Figure 9:
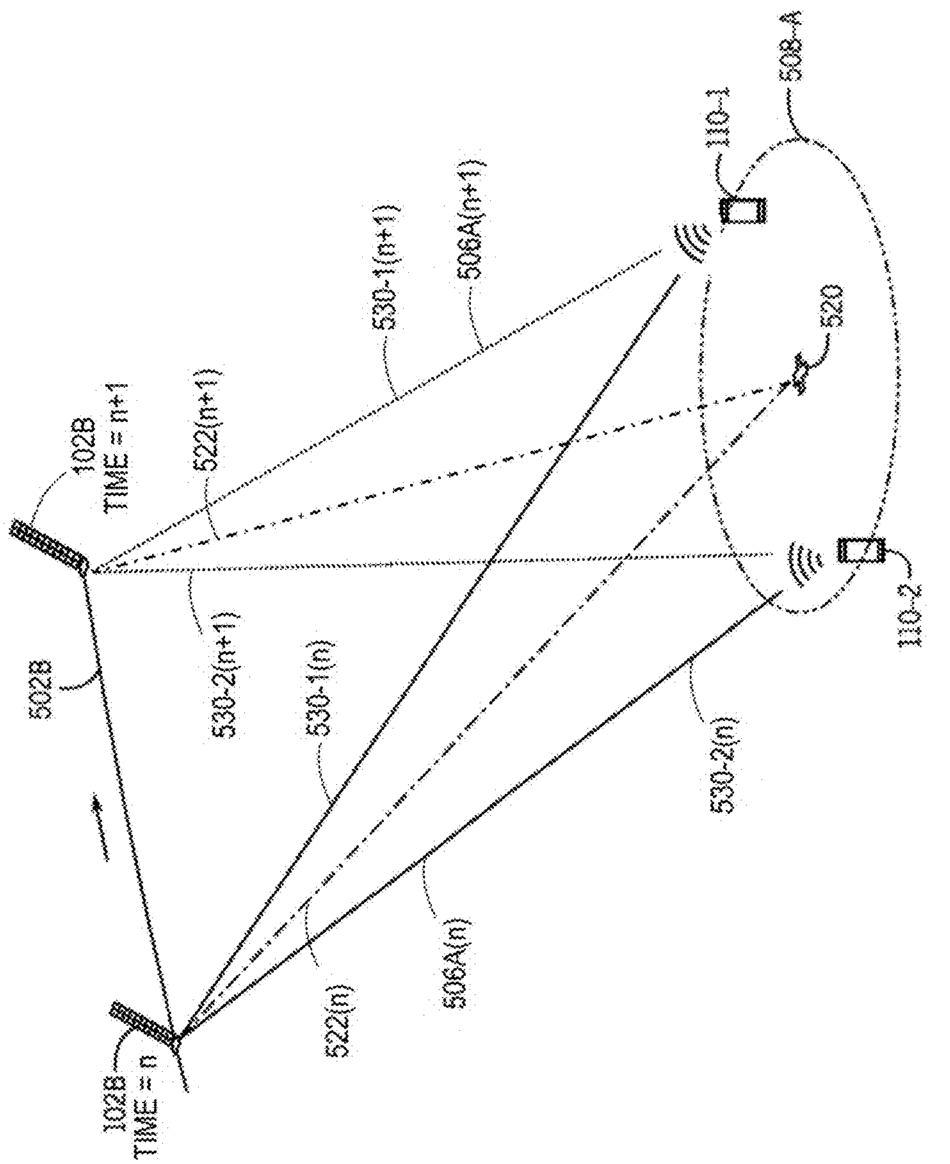
FIG. 9 illustrates a not-to-scale schematic diagram of a changing geometry of the beam and beam footprint of FIG. 6 over a time interval in accordance with embodiments of the present disclosure.

Estimation of a Portion of the Residual Doppler Shift Based on Assignment to a Smaller Geographic Region FIG. 8 is a schematic diagram of UE 110 located in smaller geographic regions 802 within the beam footprint 508-A of FIG. 6. Although only a few UE 110 are illustrated and labeled for clarity of illustration, greater numbers of UE 110 are contemplated within each smaller geographic region 802. FIG. 9 illustrates a not-to-scale schematic diagram of an example changing geometry of the beam 506A of FIG. 6 over an example time interval At. In some embodiments, additional information can be used to locate each UE 110 transmitting on the beam 506 within a boundary 808 of one of the smaller geographic regions 802. The satellite computer system 103 can then correct a region-based portion of the residual Doppler shift based on a relative motion of the satellite 102B to region reference locations 820 within the smaller geographic regions 802. For example, the satellite computer system 103 can estimate a signal propagation delay for each UE 110 over a series of time points, and then apply a Gaussian-Newton algorithm to the series of signal propagation delay values to estimate the location of the UE 110 within the beam 506.

More specifically, the position of satellite 102B is shown at two different times n and n+1, corresponding to consecutive uplink signals received from UE 110 on the beam 506A. For example, UE 110-1 sends a signal 530-1(*n*) that is received by the satellite computer system 103 at time n, and a signal 530-1(*n*+1) that is received at time n+1. Likewise, UE 110-2 sends a signal 530-2(*n*) that is received by the satellite computer system 103 at time n, and a signal 530-2(*n*+1) that is received at time n+1. In addition, a signal 522(*n*) from the cell reference location 520 could be sampled the satellite computer system 103 at time n, and a signal 522(*n*+1) from the reference location could be sampled the satellite computer system 103 at time n+1.

The signal propagation delay T(n+1) for each signal at time n+1 can be expressed as the signal propagation delay T(n) for each signal at time n, plus the rate-of-change of the frequency of the signal (∇f) multiplied by the time between receipt of the signals (Δt). In other words, the signal propagation delay $T_{ref}$ at time n+1 for the reference signal can be expressed as:

$$T_{ref}(n+1)=T_{ref}(n)+\nabla f_{ref}*\Delta t \quad (1)$$

Likewise, the signal propagation delay $T_1$ at time n+1 for the signal from UE 110-1 can be expressed as:

$$T_1(n+1)=T_1(n)+\nabla f_1*\Delta t \quad (2)$$

For reasons explained below, it is helpful to subtract equation (1) from equation (2), which yields:

$$T_1(n+1)-T_{ref}(n+1)=T_1(n)+\nabla f_1*\Delta t-T_{ref}(n)-\nabla f_{ref}*\Delta t \quad (3)$$

Equation (3) can be simplified to the following form:

$$T_1(n+1)=T_{ref}(n+1)+T_1(n)-T_{ref}(n)+(\nabla f_1-\nabla f_{ref})*\Delta t \quad (4)$$

Notably, the first term $T_{ref}(n+1)$ is the known signal propagation delay from the reference location 520 at time n+1. A similar equation can be written for the signal propagation at time n+1 for the signal from UE 110-2, and for any other UE 110 in the beam footprint 508A. In other words, the analysis derived here for the particular UE 110-1 is applicable to any UE 110.

Although the rate-of-change of the frequency of each signal is not known directly, a difference between the rate-of-change of the frequency of each UE signal (e.g., signal 530-1) and the rate-of-change of the frequency of the signal 522 from the reference location is embedded in a quantity that is already generated by typical base station RAN protocols, referred to in 4G LTE or 5G NR as the "timing advance" (TA) command. For example, the base station protocol implemented as an eNodeB measures a timing offset of an uplink subframe in each uplink signal received from UE 110-1, and sends back to the UE 110-1 a TA command calculated to cause the UE to adjust its uplink transmission timing to compensate for the timing offset.

More specifically, as described above, the signals 530 for all UE 110 on the beam 506-A are first compensated at the satellite computer system 103 for the relative distance and motion between the satellite 102B and the reference location 520. The satellite computer system 103 can then estimate an initial timing offset value $T_1(1)$ for the UE 110-1, which can be designated as occurring at n=1, relative to the timing offset $T_{ref}(1)$ from the reference location 520. In the example embodiment, the satellite computer system 103 includes a PRACH detector 1008 (shown in FIG. 10) configured to detect requests for an uplink allocation from UE 110 that are attempting to join the RAN. More specifically, the RAN protocol typically defines a physical random access channel (PRACH) slot and an access signal format that should used by UE 110 to request the uplink allocation from the base station platform. In some embodiments, the PRACH detector 1008 uses special properties of the access signal format (which is based on a Zadoff-Chu sequence in 4G LTE and 5G NR embodiments) to detect the access signal despite the residual timing offset and Doppler shift of the UE 110 that originated the signal, and also provides a relatively precise correction for the residual timing offset that can be used as the first TA command in the access response message from the satellite base station platform implemented by the satellite computer system 103. For example, in the $G LTE and 5G NR RAN protocols, the eNodeB implemented by the satellite computer system 103 can send this initial TA command in the Random Access Response (RAR) to the UE 110. In the notation introduced above, the residual timing offset for the UE 110-1 when the access signal is received can be written as $T_1(1)-T_{ref}(1)$. Notably, these are the initial values for the second and third terms in equation (4) above.

In some cases, the initial access request to the RAN can be received at another satellite 102. For example, the other satellite 102 may have been in position over the geographic region where the first UE 110-1 is located prior to the current time, and the first UE 110-1 may have established communications first with the other satellite 102. As the other satellite 102 moves away from the geographic region, it can hand off communications with the first UE 110-1 to the present satellite (or through a number of intermediate satellites 102 to the present satellite). In such cases, the satellite computer system 103 of the other satellite 102 can pass the initial TA command forward to the satellite computer system 103 of the present satellite as the present satellite moves into position over the geographic region, for continued use in equation (5) as implemented by the present satellite.

After the access signal from the UE 110-1 is successfully acquired, the base station RAN typically is programmed to generate a TA command for each subsequent uplink signal received from the UE 110-1. Each subsequent TA command is calculated and provided as an adjustment to the previous TA commands issued to the UE 110-1. Again noting that in the implementation on the satellite computer system 103, the UE signals are pre-compensated based on the cell reference location 520, the TA command calculated from the subsequent uplink signal received at time n+1 from the UE 110-1, representing the adjustment from the uplink signal received at time n, can be written in the notation introduced above as $(\nabla f_1-\nabla f_{ref})*\Delta t$, which precisely corresponds to the final term in equation (4) above. Substituting the series of TA command values, as well as the initial values $T_1(1)$ and $T_{ref}(1)$, into equation (4) yields:

$$T_1(n+1)=T_{ref}(n+1)+(T_1(1)-T_{ref1}(1))+\sum_{k=1}^{n}TA(k+1) \quad (5)$$

In other words, the signal propagation delay $T_1$ for a signal received from UE 110-1 at any time n+1 can be estimated as the known signal propagation delay from the cell reference location 520 at time n+1, plus the known initial TA command generated by the RAN protocol from the PRACH signal, plus the sum of known subsequent TA commands generated by the RAN protocol for the UE 110-1 after the signal was acquired.

As noted above with respect to the initial access request, in some cases, at least a portion of the subsequent TA commands can be received by one or more other satellites 102 that were in sequential communication with the first UE 110-1 prior to communications with the present satellite at the current time. In such cases, the satellite computer system 103 of the other satellite 102 can pass information about the portion of the subsequent TA commands forward to the satellite computer system 103 of the present satellite as the present satellite moves into position over the geographic region, for continued use in equation (5) as implemented by the present satellite.

Figure 10:
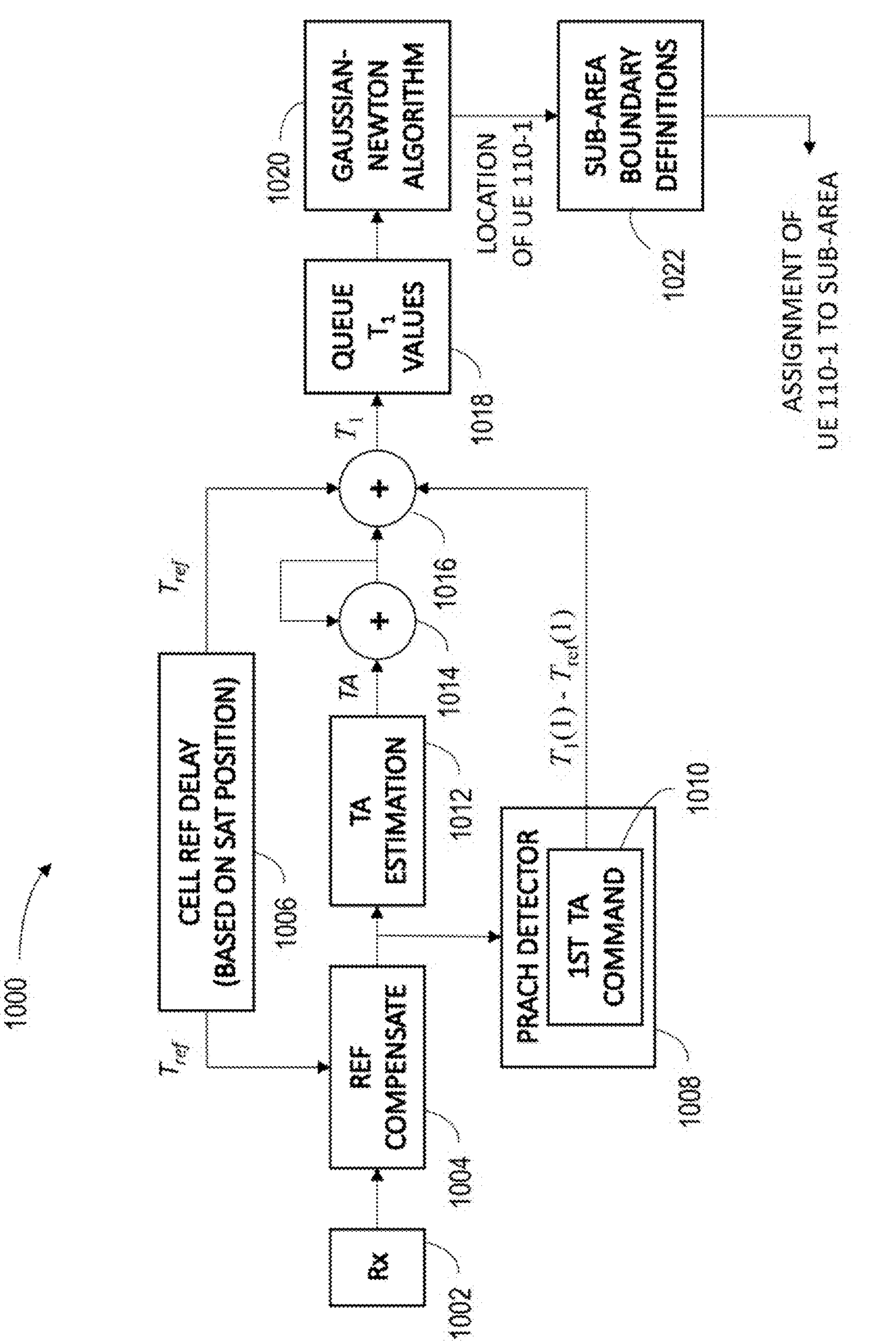
FIG. 10 illustrates a schematic block diagram of a user equipment location estimation algorithm that can be implemented by the satellite telecommunications system of FIG. 1A in accordance with embodiments of the present disclosure.

FIG. 10 illustrates a schematic block diagram of an algorithm 1000 that can be used in the satellite computer system 103 to implement equation (5) and assign each UE 110 to one of the smaller geographic regions 802 within the beam footprint 508A. An Rx data stream 1002 received by the phased array antenna 105 on the beam 506A can be sent to a reference location compensator 1004, which can apply the signal propagation latency correction value $T_{ref}$ to the Rx data stream based on the expected signal propagation latency for signals received from the reference location 520 (e.g., the center of the cell or another appropriate location). The expected signal propagation latency can be calculated at a series of points in time by a cell reference delay calculator 1006, based on the satellite's trajectory relative to the reference location 520, and provided for each appropriate time interval.

The reference location-compensated Rx data stream is forwarded to a PRACH detector 1008. When an access request from the UE 110-1 is successfully detected for the first time by the PRACH detector 1008, the RAN base station protocol initial TA estimator 1010 calculates and sends an initial TA command $T_1(1)-T_{ref}(1)$ to the UE 110-1 in the response downlink (not shown). For purposes of the algorithm 1000, the initial TA command can also be forwarded to a second summation block 1016.

The reference location-compensated Rx data stream is also processed by a TA estimation algorithm 1012 of the base station protocol, which calculates standard TA commands for the UE 110 after they have successfully accessed the RAN and are in communication with the satellite telecommunications system 100 via the beam 506A. The TA values for the UE 110-1 generated by the TA estimation algorithm 1012 can also be forwarded to a first summation block 1014, which implements the summation term of equation (5).

In association with each uplink signal at time n+1 from the UE 110-1, the second summation block 1016 combines the reference-location signal propagation latency correction value $T_{ref}(n+1)$ from the cell reference delay calculator 1006, the initial TA command from the initial TA estimator 1010, and the running summation of TA values up to time n+1 from the first summation block 1014 to estimate the signal propagation delay $T_1(n+1)$ for UE 110-1.

Alternative implementations of the equation (5) by the satellite computer system 103 are also contemplated.

The algorithm 1000 can further include a buffer 1018 configured to accumulate a series of the $T_1(n+1)$ values, and the buffer 1018 can provide the accumulated series of values to a suitable position-estimation Gaussian-Newton algorithm 1020. The position-estimation Gaussian-Newton algorithm 1020 can estimate a position at time n+1 of the UE 110-1 based on the series of signal propagation delay values. Examples of Gaussian-Newton algorithms that can estimate a location that best fits an input series of signal propagation delay points are well-known from, for example, the field of estimating locations of wireless sensors, and will not be described in detail here.

The algorithm 1000 can also include boundary definitions 1022 for the boundaries 808 of the smaller geographic regions 802. More specifically, the algorithm 1000 can apply the boundary definitions 1022 to the location of the UE 110-1 output by the Gaussian-Newton algorithm 1020 at the time n+1, and can assign the UE 110-1 to the corresponding smaller geographic region 802 within the beam footprint 508A.

The satellite computer system 103 can then correct the region-based portion of the residual Doppler shift based on the trajectory of the satellite 102B relative to the region reference location 820 (e.g., the center of the smaller geographic region 802 or another appropriate location) within the assigned smaller geographic region 802. Recall that, in the example embodiment, the Rx data stream from the beam 506 has already been compensated for a reference Doppler shift based on the cell reference location 520. Accordingly, the region-based portion of the residual Doppler shift can be calculated based on a difference in the satellite velocity as seen from the region reference location 820 and the satellite velocity as seen from the cell reference location 520. However, other implementations for correcting for the region-based residual Doppler shift are also contemplated. In the example embodiment, the satellite computer system 103 calculates, for each smaller geographic region 802, the expected region-based portion of the residual Doppler shift for the region reference location 820 at a series of points in time and applies a corresponding region-based Doppler correction value to the uplink data for the UE 110-1 to post-compensate the region-based portion of the residual CFO (recalling that "residual CFO" refers to the CFO that remains after the initial post-compensation for Doppler shift relative to the cell reference location 520).

In general, some portion of the residual CFO will remain after compensation for the region-based portion is performed based on the region reference location 820. A magnitude range of the remaining portion depends upon a size of the smaller geographic regions 802. For example, if an orbital altitude of the satellite 102B is about 535 kilometers, a diameter of the boundary 808 can be set at about 7 kilometers in order to limit the remaining portion of the residual CFO to within about plus-or-minus 1,500 Hz for a stationary UE 110-1, plus an amount caused by motion of the UE 110-1 relative to the region reference location 820. Other sizes for the smaller geographic regions 802 are also contemplated. Other compensation techniques, such as but not limited to any combination of the coarse or fine correction time-domain techniques described above or subsequently herein, can then be used in combination with the grouping into smaller geographic regions 802 to reduce the remaining residual CFO to within the limits of the RAN protocol of the base station implemented at the satellite computer system 103.

Estimating a Fine Portion of the Doppler Shift and then Applying Hypothesized Coarse Portions to Estimate a Total Residual Doppler Shift In some embodiments, one or both of the "coarse" residual Doppler correction, based for example on CP correlation of each OFDM as described above, and the "fine" residual Doppler correction, based for example on the DMRS correlation within the two slots of a subframe as described above, can be performed with greater computational efficiency, and in some applications greater accuracy, in the frequency domain. For example, performing these correlations in the frequency domain can be less sensitive to a signal in a small resource block allocation, and also can be less sensitive to large timing offsets caused by signal propagation delay.

In particular, in some applications both a computational efficiency benefit and an accuracy benefit can be obtained by first deriving the fine residual Doppler correction for the signal for the UE 110-1 using standard techniques to correlate the DMRS slots within the subframe of the received signal, and then incorporating the derived fine residual Doppler correction into the step of determining the coarse residual Doppler correction.

Figures 11, 12:
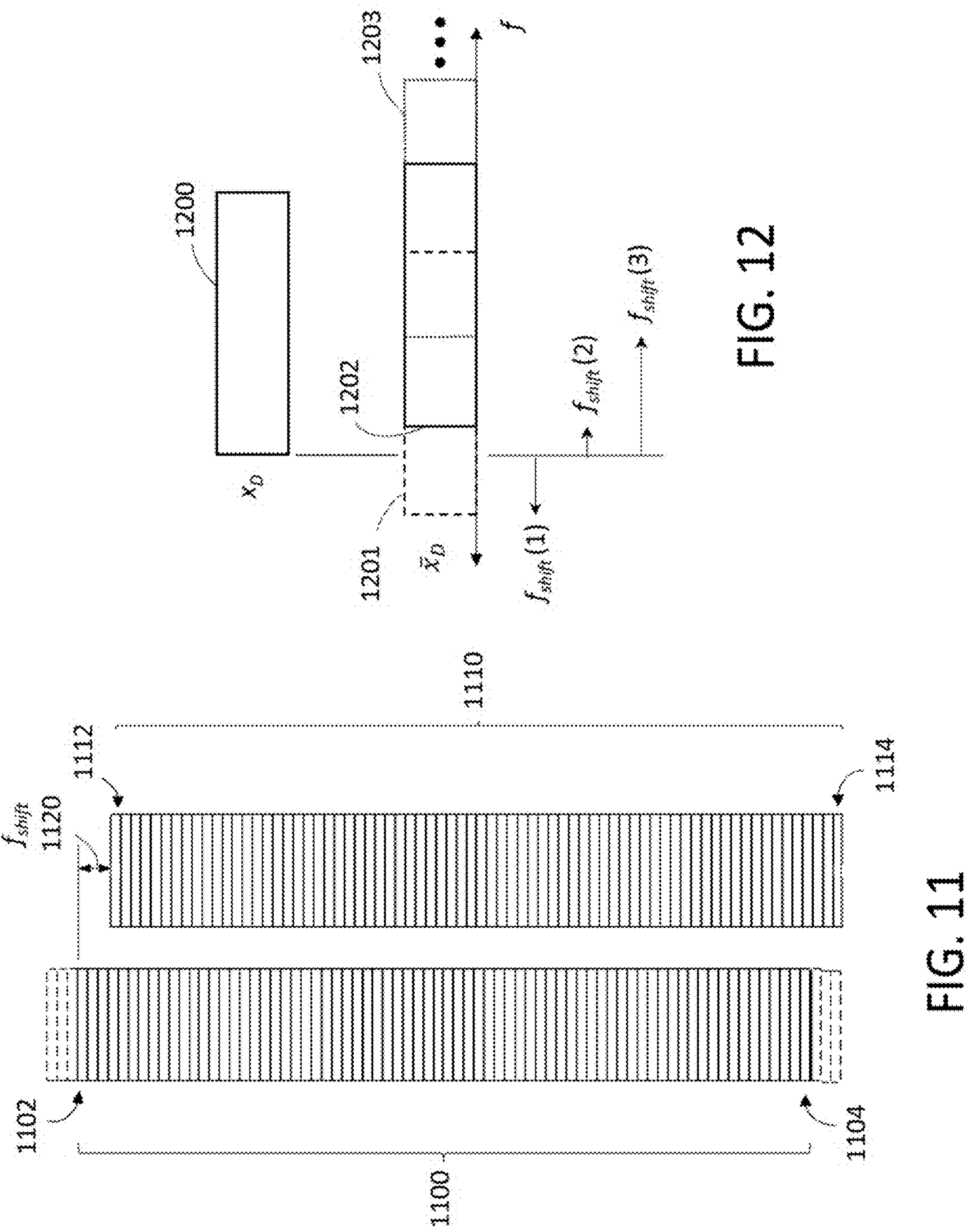
FIG. 11 illustrates a simplified schematic illustration of Fourier transforms of an unshifted Demodulation Reference Signal (DMRS) and a Doppler-shifted version of the DMRS in accordance with embodiments of the present disclosure.
FIG. 12 illustrates a simplified schematic illustration of a plurality of hypothesized frequency-shifted reference DMRSs, each hypothesized shift corresponding to a different hypothesized coarse Doppler shift, in accordance with embodiments of the present disclosure.

FIG. 11 illustrates a simplified schematic illustration of a Fourier transform 1100 of a DMRS without residual CFO (that is, of the DMRS as transmitted by the UE 110-1 and corrected based on the cell reference location 520) and a Fourier transform 1110 of the residual CFO-shifted version of the DMRS. The Fourier transform 1100 of the non-residually shifted signal can include values in frequency bins between a first bin 1102 and last bin 1104 (inclusive). The Fourier transform 1110 of the residually shifted signal can likewise include values in frequency bins between a first bin 1112 and last bin 1114 (inclusive). The values for the residually shifted signal are shifted by a number 1120 of frequency bins from the values for the non-residually shifted signal. The number 1120 of frequency bins corresponds to the residual Doppler shift, $f_{shift}$. The residual Doppler shift can be expressed as a sum of a coarse residual Doppler shift fb and a fine residual Doppler shift $f_f$.

$$f_{shift}=f_c+f_f \tag{6}$$

As discussed above, assuming that the residual Doppler shift remains essentially constant over the one millisecond interval of the subframe, $f_f$ can be determined by correlating the DMRS in the two slots of the subframe, using either standard time domain or standard frequency domain techniques. As noted above, for a true CFO greater in magnitude than about 1 kHz, the result of correlating the DMRS data simply "wraps around" or shifts back to zero, which masks any residual CFO greater in magnitude than about 1 kHz. However, the novel approach of calculating the fine residual Doppler shift $f_f$ first enables the overall residual Doppler shift to be estimated with sufficient accuracy by simply hypothesizing several candidate coarse residual Doppler shift values $f_c$, and testing a result for each hypothesized $f_c$ against the received signal from the UE 110-1 to find a most likely match. As will be described in more detail below, the testing can include, for example, one or more of an evaluation of a metric across multiple hypothesized $f_c$ or an evaluation of other information available to the satellite computer system 103 that can be relevant to an observed Doppler shift.

As noted above, the base station implemented by the satellite computer system 103 determines the sequence parameters used by the UE to generate the DMRS, and accordingly an unshifted reference form of the DMRS, designated $x_D$, can also be generated by the satellite computer system 103. The satellite computer system 103 can then generate an expected "shifted" version $\overline{x}_D$ of the reference DMRS signal $\overline{x}_D$ for each hypothesized $f_c$. In other words, the shifted version $\overline{x}_D$ is the hypothetical Doppler-distorted version of the reference DMRS based on the hypothesized coarse portion $f_c$. FIG. 12 illustrates a simplified schematic illustration of the unshifted reference form 1200 of the DMRS $x_D$ and a plurality of hypothesized frequency-shifted versions $\overline{x}_D$ of the reference DMRS $x_D$, designated 1201, 1202, and 1203. Each hypothesized frequency-shifted reference version $\overline{x}_D$ of the DMRS corresponds to a different hypothesized coarse Doppler shift $f_c$. More specifically, the hypothesized frequency-shifted reference DMRS 1201 is shifted in the frequency domain by a frequency $f_{shift}(1)$ equal to the previously estimated fine portion $f_f$ plus a first hypothesized coarse portion $f_c(1)$; the hypothesized frequency-shifted reference DMRS 1202 is shifted in the frequency domain by a frequency $f_{shift}(2)$ equal to the previously estimated fine portion $f_f$ plus a second hypothesized coarse portion $f_c(2)$; and the hypothesized frequency-shifted reference DMRS 1203 is shifted in the frequency domain by a frequency $f_{shift}(3)$ equal to the previously estimated fine portion $f_f$ plus a third hypothesized coarse portion $f_c(3)$. Although three hypothesized frequency-shifted reference DMRSs (corresponding to three hypothesized coarse portions $f_c$) are illustrated, any number of hypothesized coarse portions $f_c$ can be used.

In some embodiments, the selection of a set of hypothesized $f_c$ for evaluation can be based on a potential range of residual Doppler shift that can be expected. More specifically, the set can be selected to divide a potential range of the residual Doppler shift into intervals such that each interval is no larger than an accuracy of the estimated fine portion. One $f_c$ of the set can then be selected, for example based on one or more of an evaluation of a metric across multiple $f_c$ or other information available to the satellite computer system 103, with the knowledge that the fine residual Doppler shift $f_f$ accurate to within the size of the interval will resolve any ambiguity within the interval.

As noted above, in the example embodiment, the satellite computer system 103 pre-compensates each downlink signal based on the Doppler shift seen at the (stationary) cell reference location 520, but does not attempt to pre-compensate for the residual Doppler shift that will be seen by the UE 110 in the downlink signal. Therefore, the uplink frequency (calibrated by the UE 110 based on the downlink signal) will include a mis-calibration due to the residual Doppler shift in the downlink signal. This mis-calibration effectively doubles the residual Doppler shift in the uplink signal as received by the satellite computer system 103 (after correction based on the Doppler shift at the cell reference location 520). As a result, the potential residual Doppler shift (after reference-location correction) seen by the satellite computer system 103 for signals received from the UE can be about 2.3 ppm, which corresponds to plus-or-minus 6,000 Hz for a 2.7 GHZ carrier frequency. Based on the knowledge that the estimate of the fine residual Doppler shift $f_f$ is accurate to within plus-or-minus 1,000 Hz in this example, the set of hypothesized $f_c$ can be selected to cover the potential plus-or-minus 6,000 Hz range in 2,000 Hz intervals. One $f_c$ of the set can then be selected, for example based on one or more of an evaluation of a metric across multiple $f_c$ or other information available to the satellite computer system 103. For example, the set of hypothesized $f_c$ can be selected to include:

$$f_c=\{-6\text{ kHz},-4\text{ kHz},-2\text{ kHz},0\text{ kHz},2\text{ kHz},4\text{ kHz},6\text{ kHz}\} \tag{7}$$

However, other sets of hypothesized $f_c$ are also contemplated.

Maximum Likelihood Approach to Select the Coarse Portion of the Doppler Shift

In some embodiments, a maximum likelihood approach is used to test the hypothesized frequency-shifted reference DMRSs against the received signal from the UE 110-1. After the fine Doppler shift $f_f$ is estimated (for example, by using simple DMRS correlation as described above), the satellite computer system 103 can generate, for each hypothesized coarse Doppler shift $f_c$, filter coefficients w that produce a frequency shift corresponding to the overall residual Doppler shift $f_{shift}$, written as $f_c+f_f$, normalized by the subcarrier spacing in the frequency domain (that is, 15 kHz or 15,000 Hz in 4G LTE):

$$w(k) = e^{j\pi\left(\frac{fc+ff}{15000}+k\right)} * \text{sinc}\left(\frac{f_c+f_f}{15000}+k\right) \tag{8}$$

The satellite computer system 103 can then apply the filter coefficients in equation (8) to the unshifted reference form of the DMRS $x_D$ to generate, for each hypothesized coarse Doppler shift $f_c$, a reference Doppler-distorted DMRS sequence ID:

$$\overline{x}_D(i) = \sum_n x_D(i+n) * w\left(n + \frac{f_c+f_f}{15000}\right) \tag{9}$$

Next, the satellite computer system 103 can correlate the reference Doppler-distorted DMRS sequence $\overline{x}_D$ generated for each hypothesized coarse Doppler shift $f_c$ with the DMRS actually received at the satellite 102B (albeit already corrected for Doppler shift based on the cell reference location 520), designated $y_D$, to calculate a maximum likelihood metric γ:

$$\gamma = \sum_i \overline{x}_D(i) * y_D^*(i) \tag{10}$$

where $$y_D^*(i)$$

(i) is the complex conjugate of $$y_D(i).$$

(i).

In some embodiments, with particular reference to FIG. 7, the maximum likelihood metric is calculated for each subframe 700 received from the UE 110-1. Although only one summation term is shown in equation (10), the maximum likelihood equation can include two such summation terms, with the first summation term corresponding to the first DMRS symbol 710 in the subframe 700 and the second summation term corresponding to the second DMRS symbol 710 in the subframe 700. Other implementations of a maximum likelihood metric are also contemplated.

The satellite computer system 103 then selects the hypothesized $f_c$ that leads to the largest maximum likelihood metric y as the estimated coarse residual Doppler shift correction, and corrects the residual Doppler shift in the received signal from the UE 110-1 by applying the complex conjugate of the filter w to "de-shift" or remove the residual Doppler correction from the signal. In other words, the satellite computer system 103 can generate the complex conjugate filter w* as:

$$w^*(k) = e^{j\pi\left(\frac{-(fc+ff)}{15000}+k\right)} * \text{sinc}\left(\frac{-(f_c+f_f)}{15000}+k\right) \tag{11}$$

Notably, in some applications, embodiments of the maximum likelihood approach described above produce more accurate Doppler shift estimates than does separately or initially generating the coarse residual Doppler shift estimate. However, other approaches, including but not limited to those described herein such as assigning UE 110 to smaller geographic regions 802 or developing coarse residual Doppler estimates separately (for example using CP correlation), are also contemplated for use either in combination with or alternatively to the maximum likelihood approach. For example, if the approach of assigning the UE 110-1 to a smaller geographic region 802 and estimating a region-based portion of the residual Doppler shift, here designated $f_{region}$, is used in combination with the maximum likelihood approach, the total frequency shift term $f_c+f_f$ in equations (6)-(11) can be replaced by $f_c+f_f+f_{region}$ in order to select from among the set of hypothesized $f_c$.

In some cases, due for example to a low signal-to-noise ratio in uplink transmissions from the UE 110-1, the $f_c$ that corresponds to the actual residual Doppler shift can produce a lower value of the maximum likelihood metric than does the $f_c$ that maximizes the maximum likelihood metric. This can result in the received signal from the UE 110-1 being de-shifted for residual Doppler based an incorrect $f_c$. However, an incorrectly de-shifted signal can typically be detected by conventional signal error-checking approaches, such as a cyclic redundancy check (CRC). In some embodiments, the satellite computer system 103 is programmed to apply such an error check after the received signal has been de-shifted based on the first selected $f_c$ and, if the error check fails, to select the $f_c$ that produced the second best maximum likelihood metric, regenerate the de-shifting filter w*(k) based on the new $f_c$, and regenerate the de-shifted received signal using the regenerated filter. In most cases in which the $f_c$ corresponding to the best maximum likelihood metric yields an incorrect result for the residual Doppler shift, the $f_c$ corresponding to the second-best maximum likelihood metric yields the correct result.

Additionally or alternatively, the satellite computer system 103 can be programmed to preemptively detect cases in which the maximum likelihood metric is most likely to produce an erroneous result for $f_c$. For example, if a difference between the best and second-best maximum likelihood metrics is less than a predetermined threshold, the satellite computer system 103 can initially select from between the two corresponding $f_c$ values by selecting the $f_c$ that, when added to the separately determined $f_f$, produces a residual Doppler shift value closest to the residual Doppler shift value that was determined for the previous signal received from the UE 110-1. In other words, the satellite computer system 103 can be programmed to resolve cases in which the maximum likelihood metric yields an ambiguous result by selecting the $f_c$ that best provides continuity with one or more residual Doppler shifts determined previously by the satellite computer system 103 for the UE 110-1.

Use of Other Information Available to the Satellite Computer System to Select the Coarse Portion of the Doppler Shift In certain embodiments, rather than applying the relatively computationally intensive maximum likelihood approach for every UE 110, the satellite computer system 103 can be programmed to simply select the coarse residual value $f_c$ for at least one UE 110 from among the set based on one or more previous residual Doppler estimates, without evaluating or comparing multiple values of $f_c$. In many cases, some number of the UE 110 in the beam footprint 508 are sufficiently close to the reference location 520 such that the residual Doppler shift, after correction based on the reference location 520, is no greater than the resolution of $f_f$. For example, where the beam footprint 508 includes a specific location expected to have a large number of UE 110 communicating (based, for example, on past usage history or recent data from the satellite 102 that was covering the region immediately prior to satellite 102B), the satellite computer system 103 can be programmed to select the specific location as the reference location 520 in order to increase a number of UE 110 for which $f_c$ is zero. Recalling that a form of the initial PRACH access signal from the UE 110-1 allows the satellite computer system 103 to determine a more accurate initial estimation of residual Doppler shift for the initial access signal, the satellite computer system 103 can identify each UE 110 for which an $f_c$ of zero is determined during the initial PRACH access, and can put those UE 110 in a group for which $f_c$ is assumed to be zero for subsequent uplink signals on the beam 506. The satellite computer system 103 can continue to apply the maximum likelihood approach to UE 110 not in the group to determine the correct $f_c$.

Of course in some cases, an $f_c$ of zero may not correspond to a UE location near the reference location 520. For example, the UE 110-1 may be in a vehicle, and a velocity of the UE 110-1 relative to the reference location 520 during PRACH may cancel a portion of the residual CFO that would have been present based on location alone. If the assumption that $f_c$ will remain zero does not hold, the residual Doppler estimate for a subsequent uplink signal based on an $f_c$ of zero will produce a de-shifted signal for the UE 110-1 that does not pass error checking. In some embodiments, the satellite computer system 103 can be programmed to switch to selecting $f_c$ based on the maximum likelihood approach for a particular UE 110 in the $f_c$ of zero group in response to such an error checking result.

In certain embodiments, the satellite computer system 103 can be programmed to extend the reliance on previous Doppler estimates, in lieu of the maximum likelihood method, beyond UE 110 suspected to be near the reference location 520. For example, the satellite computer system 103 can be programmed to set $f_c$ for each uplink signal from the UE 110-1 based on one or more previous residual Doppler estimates for that UE. Again, the initial $f_c$ (whether zero or otherwise) can be determined with sufficient accuracy from the PRACH access signal from the UE 110-1, and the satellite computer system 103 can estimate the $f_{shift}$ for the next uplink signal by adding the $f_f$ determined for the next uplink signal to the initial $f_c$. In many cases, the initial $f_c$ interval will remain sufficiently accurate to yield an accurate $f_{shift}$ over several uplink signals. Again, if the residual Doppler estimate for a subsequent uplink signal based on the initial $f_c$ produces a de-shifted signal for the UE 110-1 that does not pass error checking, the satellite computer system 103 can switch to selecting a replacement $f_c$ based on the maximum likelihood approach for that UE 110-1. In this way, computational resources can be conserved for UE 110 with a Doppler shift that changes (relative to the reference location 520) too quickly to stay within their initial $f_c$ interval.

In some embodiments, the satellite computer system 103 is not limited to applying a constant $f_c$ for every uplink signal until the resulting de-shifted signal does not pass an error-check. For example, the satellite computer system 103 can track a trend in the fine frequency correction $f_f$ for UE 110 over two or more uplink signals and then adjust $f_c$ to a different value (for example, another value from the set of hypothesized $f_c$) if the trend indicates that a jump in $f_c$ is imminent. For example, stationary UE 110 at different locations in the beam footprint 508 will experience characteristic changes in residual Doppler shift as the satellite 102B passes overhead, and the satellite computer system 103 can be programmed to detect these characteristic changes when they appear and adjust $f_c$ accordingly. For UE 110 that do not show a recognized trend or otherwise do not pass an error check for a subsequent de-shifted uplink signal, the satellite computer system 103 can switch to the maximum likelihood method. Again, this approach can reduce the number of UE 110 for which the relatively more computationally intensive maximum likelihood approach is required to obtain a sufficiently accurate estimation of $f_c$.

Additional or alternative approaches for estimating $f_c$ are also contemplated.

Figure 13:
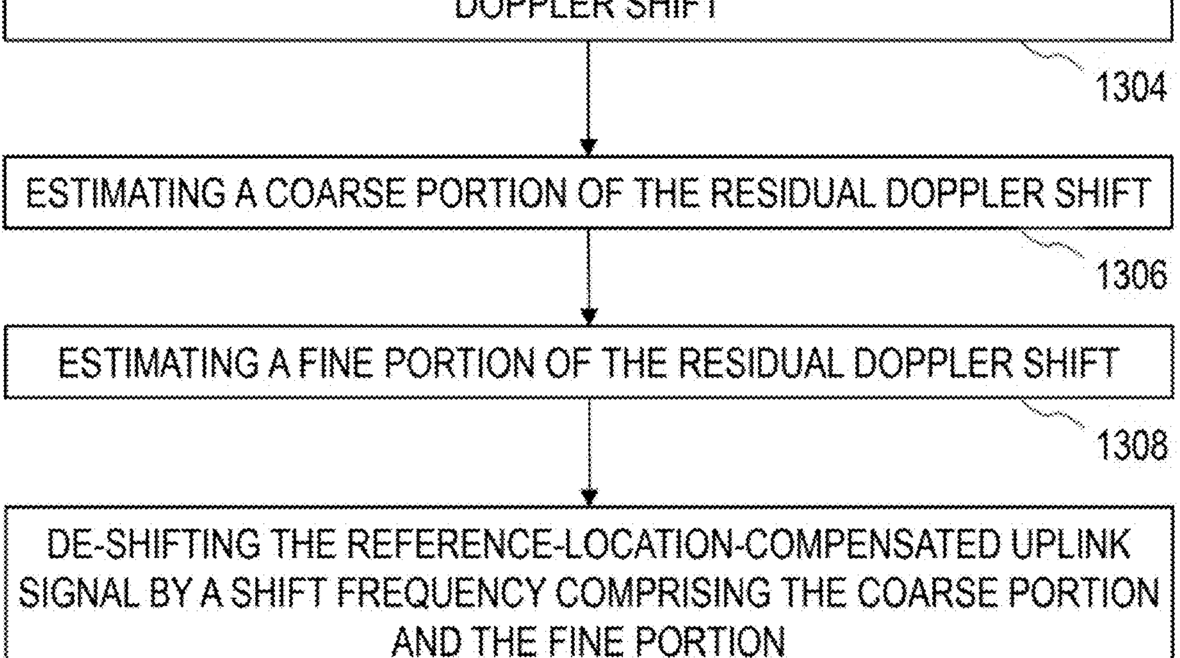
FIG. 13 illustrates an example method in accordance with embodiments of the present disclosure.

FIG. 13 illustrates an example method 1300 of operating a satellite computer system on a satellite. The satellite includes at least one antenna configured to send and receive signals to terrestrial user equipment (UE) on a radio access network (RAN) via a plurality of directional beams, with each of the beams having a beam footprint that defines a cell of the RAN. The satellite computer system includes at least one processor in communication with a memory. The method includes steps performed by the at least one processor that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth (1302); compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location (1304); estimating a coarse portion of the residual Doppler shift (1306); estimating a fine portion of the residual Doppler shift (1308); and de-shifting the reference-location-compensated uplink signal by a shift frequency comprising the coarse portion and the fine portion (1310).

A system embodiment can include a satellite computer system for a satellite, the satellite including at least one antenna configured to send and receive signals to terrestrial user equipment (UE) on a radio access network (RAN) via a plurality of directional beams, each of the beams having a beam footprint that defines a cell of the RAN. The satellite computer system includes at least one processor in communication with a memory, the memory storing computer-readable instructions that are executable to cause the at least one processor to perform steps that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth; compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location; estimating a coarse portion of the residual Doppler shift; estimating a fine portion of the residual Doppler shift; and de-shifting the reference-location-compensated uplink signal by a shift frequency comprising the coarse portion and the fine portion.

In some embodiments, the step of estimating the fine portion includes correlating a reference signal in two slots of a subframe of the uplink signal. In certain embodiments, the step of correlating the reference signal includes correlating a Demodulation Reference Signal (DMRS) in the two slots of the subframe.

In some embodiments, the step of estimating the coarse portion includes correlating a cyclic prefix (CP) in one or more symbols of one or more slots of a subframe of the uplink signal.

In certain embodiments, the steps further include estimating a geographic location of the first UE, and assigning the first UE to a smaller geographic region within the beam footprint based on the estimated geographic location, wherein the shift frequency further includes a region-based portion based on the trajectory of the satellite relative to a region reference location within the smaller geographic region. In some embodiments, the step of estimating the geographic location includes accumulating a series of signal propagation delay values for the first UE, and applying a Gaussian-Newton position-estimation algorithm to the series of signal propagation delay values. In certain embodiments, the step of accumulating the series of signal propagation delay values includes generating one of the signal propagation delay values in the series by, for a time corresponding to the signal propagation delay value: summing an initial timing adjustment command for the first UE, additional timing adjustment commands for the first UE, and the signal propagation delay from the cell reference location at the time, wherein the initial timing adjustment command is associated with an initial access request by the first UE to the RAN and the additional timing adjustment commands are associated with further communications from the first UE to the RAN between the initial access and the time.

In some embodiments, the step of estimating the fine portion is performed before the step of estimating the coarse portion, and the estimated fine portion is incorporated into the step of estimating the coarse portion.

In certain embodiments, the step of estimating the coarse portion includes selecting the coarse portion from among a set of hypothesized coarse portions, wherein the set divides a potential range of the residual Doppler shift into intervals and each interval is no larger than an accuracy of the estimated fine portion. In some embodiments, the step of estimating the coarse portion further includes generating, for each hypothesized coarse portion in the set, filter coefficients that produce a frequency shift including the hypothesized coarse portion plus the estimated fine portion; applying the filter coefficients for each hypothesized coarse portion in the set to an unshifted reference version of the received uplink signal to generate a reference Doppler-distorted uplink signal for each hypothesized coarse portion in the set; correlating, for each hypothesized coarse portion in the set, the reference Doppler-distorted uplink signal and the received uplink signal; and selecting one of the hypothesized coarse portions as the estimated coarse portion by comparing a result of the correlation for each hypothesized coarse portion in the set. In certain embodiments, the step of de-shifting the reference-location-compensated uplink signal includes applying a complex conjugate of the filter coefficients associated with the estimated coarse portion to the reference-location-compensated uplink signal.

In some embodiments, the steps further include error-checking the de-shifted uplink signal; in response to the error-checking detecting an error, selecting an other of the hypothesized coarse portions as a replacement estimated coarse portion; and re-executing the step of de-shifting the reference-location-compensated uplink signal by applying a complex conjugate of the filter coefficients associated with the replacement estimated coarse portion to the reference-location-compensated uplink signal.

In certain embodiments, the step of selecting the one of the hypothesized coarse portions as the estimated coarse portion includes determining that a difference between a best result of the correlation, associated with a first hypothesized coarse portion, and a second-best result of the correlation, associated with a second hypothesized coarse portion, is less than a predetermined threshold; in response to the determination, comparing a previous residual Doppler shift value determined for a previous uplink signal from the first UE to a first potential residual Doppler shift, corresponding to the first hypothesized coarse portion, and to a second potential residual Doppler shift, corresponding to the second hypothesized coarse portion; and selecting the estimated coarse portion as the one of the first and second hypothesized coarse portions for which the comparison to the previous residual Doppler shift value is closest.

In some embodiments, the step of selecting the coarse portion includes selecting the coarse portion from among the set based on one or more previous residual Doppler estimates by the satellite computer system. In some such embodiments, the steps further include error-checking the de-shifted uplink signal; in response to the error-checking detecting an error, generating, for two or more of the hypothesized coarse portions in the set, filter coefficients that produce a frequency shift comprising the hypothesized coarse portion plus the estimated fine portion, applying the filter coefficients for each of the two or more hypothesized coarse portions to an unshifted reference version of the received uplink signal to generate a reference Doppler-distorted uplink signal for each of the two or more hypothesized coarse portions, correlating, for each of the two or more hypothesized coarse portions, the reference Doppler-distorted uplink signal and the received uplink signal, and selecting one of the two or more hypothesized coarse portions as a replacement estimated coarse portion by comparing a result of the correlation for each of the two or more hypothesized coarse portions; and re-executing the step of de-shifting the reference-location-compensated uplink signal by applying a complex conjugate of the filter coefficients associated with the replacement estimated coarse portion to the reference-location-compensated uplink signal. Additionally or alternatively, a previous estimated coarse portion is associated with the one or more previous residual Doppler estimates, and the step of selecting the coarse portion further includes tracking a trend in the fine portion over two or more uplink signals from the first UE; and selecting the coarse portion to be one of the hypothesized coarse portions different from the previous estimated coarse portion in response to the trend indicating that a change in a value of the coarse portion is imminent.

Additional or alternative steps as indicated by the discussion herein are also contemplated.

FIG. 14 illustrates another example method 1400 of operating a satellite computer system on a satellite. The satellite includes at least one antenna configured to send and receive signals to terrestrial user equipment (UE) on a radio access network (RAN) via a plurality of directional beams, with each of the beams having a beam footprint that defines a cell of the RAN. The satellite computer system includes at least one processor in communication with a memory. The method includes steps performed by the at least one processor that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth (1402); compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location (1404); estimating a geographic location of the first UE (1406); assigning the first UE to a smaller geographic region within the beam footprint based on the estimated geographic location (1408); and de-shifting the reference-location-compensated uplink signal by a shift frequency comprising a region-based portion, the region-based portion based on the trajectory of the satellite relative to a region reference location within the smaller geographic region (1410).

A system embodiment can include a satellite computer system for a satellite, the satellite including at least one antenna configured to send and receive signals to terrestrial user equipment (UE) on a radio access network (RAN) via a plurality of directional beams, each of the beams having a beam footprint that defines a cell of the RAN. The satellite computer system includes at least one processor in communication with a memory, the memory storing computer-readable instructions that are executable to cause the at least one processor to perform steps that can include one or more of: receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth; compensating the received data stream for a reference Doppler shift based on a trajectory of the satellite relative to a cell reference location within the beam footprint of the first beam, wherein the reference-location-compensated uplink signal retains a residual Doppler shift due to a difference in one or more of a location of the UE relative to the reference location and a velocity of the UE relative to the cell reference location; estimating a geographic location of the first UE; assigning the first UE to a smaller geographic region within the beam footprint based on the estimated geographic location; and de-shifting the reference-location-compensated uplink signal by a shift frequency comprising a region-based portion, the region-based portion based on the trajectory of the satellite relative to a region reference location within the smaller geographic region.

In some embodiments, the step of estimating the geographic location includes accumulating a series of signal propagation delay values for the first UE, and applying a Gaussian-Newton position-estimation algorithm to the series of signal propagation delay values. In some such embodiments, the step of accumulating the series of signal propagation delay values includes generating one of the signal propagation delay values in the series by, for a time corresponding to the signal propagation delay value: summing an initial timing adjustment command for the first UE, additional timing adjustment commands for the first UE, and the signal propagation delay from the cell reference location at the time, wherein the initial timing adjustment command is associated with an initial access request by the first UE to the RAN and the additional timing adjustment commands are associated with further communications from the first UE to the RAN between the initial access and the time.

The initial timing adjustment command can be generated by the satellite computer system, or can be generated by another satellite and forwarded from the another satellite to the satellite, wherein the another satellite is also configured to implement the RAN and is accessed by the first UE prior to receiving the data stream on the least one antenna of the satellite.

At least a portion of the additional timing adjustment commands can be generated by the satellite computer system. Additionally or alternatively, at least a portion of the additional timing adjustment commands can be generated by one or more other satellites and information about the portion can be forwarded from the one or more other satellites to the satellite, wherein the one or more other satellites are also configured to implement the RAN and are accessed by the first UE prior to receiving the data stream on the least one antenna of the satellite.

Additional or alternative steps as indicated by the discussion herein, including but not limited to one or more steps discussed above with respect to the method 1300, are also contemplated.

Figure 15:
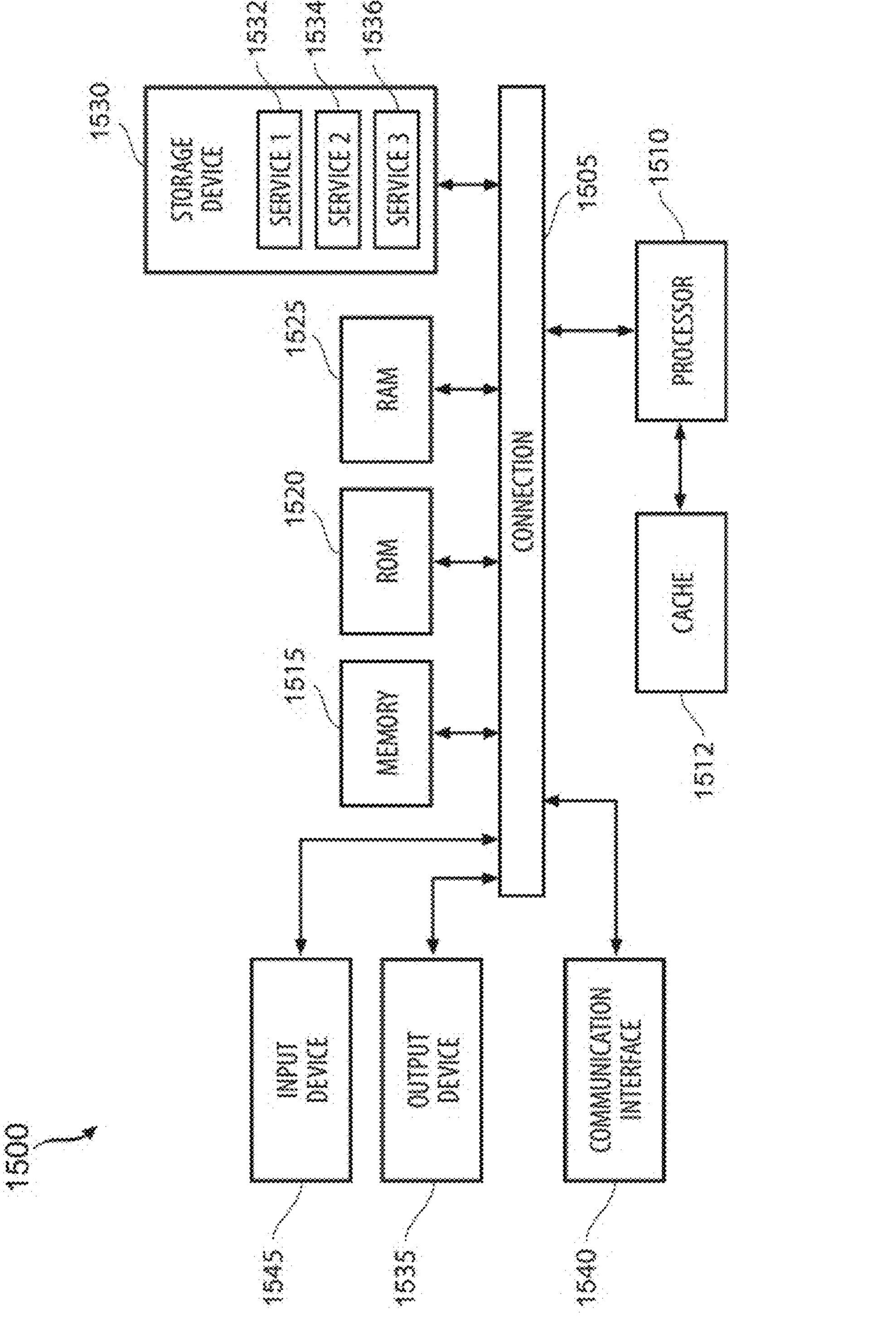
FIG. 15 illustrates a computer system that can be implemented with other aspects of the present disclosure.

FIG. 15 illustrates an example computer device that can be used in connection with any of the systems or components of the satellite computer system 103, the gateway terminal 104, the PoP 140, the cellular core 141, the terrestrial telecommunications provider 200, the UE 110, the user terminal 112, the ground-based server 150, or other components disclosed herein. In this example, FIG. 15 illustrates a computing system 1500 including components in electrical communication with each other using a connection 1505, such as a bus. System 1500 includes a processing unit (CPU or processor) 1510 and a system connection 1505 that couples various system components including the system memory 1515, such as read only memory (ROM) 1520 and random access memory (RAM) 1525, to the processor 1510. The system 1500 can include a cache of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware or software service, such as service 1-1532, service 2-1534, and service 3-1536 stored in storage device 1530, configured to control the processor 1510 as well as a special-purpose processor where software instructions are incorporated into the actual processor design. The processor 1510 may be a completely self-contained computing system, containing multiple cores or processors, a bus, memory controller, cache, etc. A multi-core processor may be symmetric or asymmetric.

To enable user interaction with the system 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the system 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include services 1532, 1534, 1536 for controlling the processor 1510. Other hardware or software modules are contemplated. The storage device 1530 can be connected to the system connection 1505. In one aspect, a hardware module that performs a particular function can include the software component stored in a computer-readable medium in connection with the necessary hardware components, such as the processor 1510, connection 1505, output device 1535, and so forth, to carry out the function.

In some embodiments, computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A satellite computer system for a satellite, the satellite including at least one antenna configured to send and receive signals to terrestrial user equipment (UE) on a radio access network (RAN) via a plurality of directional beams, each of the beams having a beam footprint that defines a cell of the RAN, the satellite computer system comprising at least one processor in communication with a memory, the memory storing computer-readable instructions that are executable to cause the at least one processor to perform steps including:

receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth;

compensating the received data stream for a reference Doppler shift based on a trajectory of the satellite relative to a cell reference location within the beam footprint of the first beam, including converting the received uplink signal to a reference-location-compensated uplink signal, wherein the reference-location-compensated uplink signal retains a residual Doppler shift due to a difference in one or more of a location of the first UE relative to the cell reference location and a velocity of the first UE relative to the cell reference location;

estimating a coarse portion of the residual Doppler shift;

estimating a fine portion of the residual Doppler shift; and de-shifting the reference-location-compensated uplink signal by a shift frequency comprising the coarse portion and the fine portion.

2. The satellite computer system according to claim 1, wherein the step of estimating the fine portion comprises correlating a reference signal in two slots of a subframe of the uplink signal.

3. The satellite computer system according to claim 2, wherein the step of correlating the reference signal comprises correlating a Demodulation Reference Signal (DMRS) in the two slots of the subframe.

4. The satellite computer system according to claim 1, wherein the step of estimating the coarse portion comprises correlating a cyclic prefix (CP) in one or more symbols of one or more slots of a subframe of the uplink signal.

5. The satellite computer system according to claim 1, wherein the steps further include:

estimating a geographic location of the first UE; and assigning the first UE to a smaller geographic region within the beam footprint of the first beam based on the estimated geographic location, wherein the shift frequency further comprises a region-based portion based on the trajectory of the satellite relative to a region reference location within the smaller geographic region.

6. The satellite computer system according to claim 5, wherein the step of estimating the geographic location comprises:

accumulating a series of signal propagation delay values for the first UE; and applying a Gaussian-Newton position-estimation algorithm to the series of signal propagation delay values.

7. The satellite computer system according to claim 6, wherein the step of accumulating the series of signal propagation delay values comprises generating one of the signal propagation delay values in the series by, for a time corresponding to the signal propagation delay value:

summing an initial timing adjustment command for the first UE, additional timing adjustment commands for the first UE, and the signal propagation delay from the cell reference location at the time, wherein the initial timing adjustment command is associated with an initial access request by the first UE to the RAN and the additional timing adjustment commands are associated with further communications from the first UE to the RAN between the initial access and the time.

8. The satellite computer system according to claim 1, wherein the step of estimating the fine portion is performed before the step of estimating the coarse portion, and the estimated fine portion is incorporated into the step of estimating the coarse portion.

9. The satellite computer system according to claim 1, wherein the step of estimating the coarse portion comprises selecting the coarse portion from among a set of hypothesized coarse portions, wherein the set divides a potential range of the residual Doppler shift into intervals and each interval is no larger than an accuracy of the estimated fine portion.

10. The satellite computer system according to claim 9, wherein the step of estimating the coarse portion further comprises:

generating, for each hypothesized coarse portion in the set, filter coefficients that produce a frequency shift comprising the hypothesized coarse portion plus the estimated fine portion;

applying the filter coefficients for each hypothesized coarse portion in the set to an unshifted reference version of the received uplink signal to generate a reference Doppler-distorted uplink signal for each hypothesized coarse portion in the set;

correlating, for each hypothesized coarse portion in the set, the reference Doppler-distorted uplink signal and the received uplink signal; and selecting one of the hypothesized coarse portions as the estimated coarse portion by comparing a result of the correlation for each hypothesized coarse portion in the set.

11. The satellite computer system according to claim 10, wherein the step of de-shifting the reference-location-compensated uplink signal comprises applying a complex conjugate of the filter coefficients associated with the estimated coarse portion to the reference-location-compensated uplink signal.

12. The satellite computer system according to claim 11, wherein the steps further include:

error-checking the de-shifted reference-location-compensated uplink signal;

in response to the error-checking detecting an error, selecting an other of the hypothesized coarse portions as a replacement estimated coarse portion; and re-executing the step of de-shifting the reference-location-compensated uplink signal by applying a complex conjugate of the filter coefficients associated with the replacement estimated coarse portion to the reference-location-compensated uplink signal.

13. The satellite computer system according to claim 10, wherein the step of selecting the one of the hypothesized coarse portions as the estimated coarse portion comprises:

determining that a difference between a best result of the correlation, associated with a first hypothesized coarse portion, and a second-best result of the correlation, associated with a second hypothesized coarse portion, is less than a predetermined threshold;

in response to the determination, comparing a previous residual Doppler shift value determined for a previous uplink signal from the first UE to a first potential residual Doppler shift, corresponding to the first hypothesized coarse portion, and to a second potential residual Doppler shift, corresponding to the second hypothesized coarse portion; and selecting the estimated coarse portion as the one of the first and second hypothesized coarse portions for which the comparison to the previous residual Doppler shift value is closest.

14. The satellite computer system according to claim 9, wherein the step of selecting the coarse portion comprises selecting the coarse portion from among the set based on one or more previous residual Doppler estimates by the satellite computer system.

15. The satellite computer system according to claim 14, wherein the steps further include:

error-checking the de-shifted reference-location-compensated uplink signal;

in response to the error-checking detecting an error, generating, for two or more of the hypothesized coarse portions in the set, filter coefficients that produce a frequency shift comprising the hypothesized coarse portion plus the estimated fine portion;

applying the filter coefficients for each of the two or more hypothesized coarse portions to an unshifted reference version of the received uplink signal to generate a reference Doppler-distorted uplink signal for each of the two or more hypothesized coarse portions;

correlating, for each of the two or more hypothesized coarse portions, the reference Doppler-distorted uplink signal and the received uplink signal; and selecting one of the two or more hypothesized coarse portions as a replacement estimated coarse portion by comparing a result of the correlation for each of the two or more hypothesized coarse portions; and re-executing the step of de-shifting the reference-location-compensated uplink signal by applying a complex conjugate of the filter coefficients associated with the replacement estimated coarse portion to the reference-location-compensated uplink signal.

16. The satellite computer system according to claim 14, wherein a previous estimated coarse portion is associated with the one or more previous residual Doppler estimates, and wherein the step of selecting the coarse portion further comprises:

tracking a trend in the fine portion over two or more uplink signals from the first UE; and selecting the coarse portion to be one of the hypothesized coarse portions different from the previous estimated coarse portion in response to the trend indicating that a change in a value of the coarse portion is imminent.

17. A method of operating a satellite computer system for a satellite, the satellite including at least one antenna configured to send and receive signals to terrestrial user equipment (UE) on a radio access network (RAN) via a plurality of directional beams, each of the beams having a beam footprint that defines a cell of the RAN, the satellite computer system including at least one processor in communication with a memory, the method comprising steps performed by the at least one processor including:

receiving, via the at least one antenna, a data stream on a first beam of the plurality of beams, the data stream including an uplink signal from a first UE, wherein the received uplink signal includes a Doppler shift due to one or more of an orbital motion of the satellite relative to the Earth and a motion of the first UE relative to the Earth;

compensating the received data stream for a reference Doppler shift based on a trajectory of the satellite relative to a cell reference location within the beam footprint of the first beam, including converting the received uplink signal to a reference-location-compensated uplink signal, wherein the reference-location-compensated uplink signal retains a residual Doppler shift due to a difference in one or more of a location of the first UE relative to the cell reference location and a velocity of the first UE relative to the cell reference location;

estimating a coarse portion of the residual Doppler shift;

estimating a fine portion of the residual Doppler shift; and de-shifting the reference-location-compensated uplink signal by a shift frequency comprising the coarse portion and the fine portion.

18. The method according to claim 17, wherein the step of estimating the fine portion comprises correlating a reference signal in two slots of a subframe of the uplink signal.

19. The method according to claim 18, wherein the step of correlating the reference signal comprises correlating a Demodulation Reference Signal (DMRS) in the two slots of the subframe.

20. The method according to claim 17, wherein the step of estimating the coarse portion comprises correlating a cyclic prefix (CP) in one or more symbols of one or more slots of a subframe of the uplink signal.

* * * * *